US008568026B2

(12) United States Patent
Gregory et al.

(10) Patent No.: US 8,568,026 B2
(45) Date of Patent: Oct. 29, 2013

(54) WIRELESS TEMPERATURE MEASUREMENT SYSTEM AND METHODS OF MAKING AND USING SAME

(71) Applicant: Wireless Sensor Technologies, LLC, Encinitas, CA (US)

(72) Inventors: Otto J. Gregory, Wakefield, RI (US); John R. Conkle, Encinitas, CA (US); Thomas J. Birnbaum, Santa Cruz, CA (US)

(73) Assignee: Wireless Sensor Technologies, LLC, Encinitas, CA (US)

( * ) Notice: Subject to any disclaimer, the term of this patent is extended or adjusted under 35 U.S.C. 154(b) by 0 days.

(21) Appl. No.: 13/735,906

(22) Filed: Jan. 7, 2013

(65) Prior Publication Data

US 2013/0125386 A1    May 23, 2013

Related U.S. Application Data

(63) Continuation of application No. 12/778,823, filed on May 12, 2010, now Pat. No. 8,348,504.

(51) Int. Cl.
*H01P 11/00*    (2006.01)
*G01K 13/04*    (2006.01)
*G01K 7/32*    (2006.01)
*G01K 7/34*    (2006.01)

(52) U.S. Cl.
USPC .............. 374/152; 374/117; 374/120; 29/601

(58) Field of Classification Search
USPC ................. 374/152, 117, 118, 119, 120, 178, 374/E7.037, E7.038, E13.001, E13.008, 374/E13.01; 340/870.07; 29/601
See application file for complete search history.

(56) References Cited

U.S. PATENT DOCUMENTS 3,006,978 A    10/1961    McGrath et al.
4,010,291 A    3/1977    Katsube et al.
(Continued)

FOREIGN PATENT DOCUMENTS

DE    19919843 A1    11/2000
EP    476730 A1    3/1992
WO    WO 2007/120881 A2    10/2007

OTHER PUBLICATIONS

Ballandras et al., *Wireless temperature sensor using SAW resonators for immersed and biological applications*, Ultrasonics Symposium, 2002. Proceedings. 2002 IEEE vol. 1, 8-11, pp. 445-448 (Oct. 2002).

(Continued)

*Primary Examiner* — R. A. Smith
(74) *Attorney, Agent, or Firm* — Jones Day

(57) ABSTRACT

A temperature measurement system capable of operating in harsh environments including a temperature sensor having an antenna, diode, and dielectric layer disposed on the object of interest is provided, wherein the antenna includes a buried portion that extends through and is electrically coupled to the object of interest, and an exposed portion disposed upon an outer surface of the dielectric layer and the diode is coupled between the object of interest and the exposed portion of the antenna. The antenna is configured to receive interrogating signals from a transmitter, and to transmit response signals corresponding to the resonant frequency of the temperature sensor and its harmonics, which are indicative of the measured temperature of the object of interest. A receiver detects the response signals and correlates the frequency to a known temperature response of the dielectric material. Methods of making and using the temperature measurement system are also provided.

20 Claims, 23 Drawing Sheets

(56) References Cited

U.S. PATENT DOCUMENTS

| | | | |
|---|---|---|---|
| 4,450,316 | A | 5/1984 | Hamakawa et al. |
| 4,665,276 | A | 5/1987 | Elbel et al. |
| 4,779,994 | A | 10/1988 | Diller et al. |
| 4,969,956 | A | 11/1990 | Kreider et al. |
| 5,135,795 | A | 8/1992 | Gregory et al. |
| 5,338,566 | A | 8/1994 | Gregory et al. |
| 5,422,636 | A | 6/1995 | Urbas et al. |
| 5,720,554 | A | 2/1998 | Smith et al. |
| 6,300,554 | B1 | 10/2001 | Du et al. |
| 6,622,567 | B1 | 9/2003 | Hamel et al. |
| 6,706,218 | B2 | 3/2004 | Lucht et al. |
| 6,729,187 | B1 | 5/2004 | Gregory |
| 6,773,158 | B2 | 8/2004 | Koshimizu |
| 6,892,438 | B1 | 5/2005 | Hill et al. |
| 6,988,026 | B2 | 1/2006 | Breed et al. |
| 7,004,622 | B2 | 2/2006 | Hardwicke et al. |
| 7,005,986 | B2 | 2/2006 | Parks, III et al. |
| 7,271,719 | B2 | 9/2007 | Ku et al. |
| 7,377,168 | B2 | 5/2008 | Liu |
| 7,434,989 | B2 | 10/2008 | Solie |
| 7,474,230 | B2 | 1/2009 | Blom et al. |
| 7,582,359 | B2 | 9/2009 | Sabol et al. |
| 8,228,172 | B2 | 7/2012 | Collins et al. |
| 8,348,504 | B2 * | 1/2013 | Gregory et al. ............... 374/152 |
| 2007/0056624 | A1 | 3/2007 | Gregory et al. |
| 2009/0145235 | A1 | 6/2009 | Gregory et al. |
| 2009/0147824 | A1 | 6/2009 | Schafer et al. |
| 2009/0173162 | A1 | 7/2009 | Gregory et al. |
| 2009/0188324 | A1 | 7/2009 | Gregory et al. |
| 2009/0277266 | A1 | 11/2009 | Wang et al. |
| 2009/0290614 | A1 | 11/2009 | Gregory et al. |
| 2010/0027584 | A1 | 2/2010 | Kulkarni et al. |
| 2010/0039290 | A1 | 2/2010 | Mitchell et al. |

OTHER PUBLICATIONS

Baxter, *Capacitive sensors design and Applications*, IEEE Press (1997).

Bergmann et al., *Multichannel Strain Gage Telemetry for Orthopedic Implants*, J. Biomechanics, vol. 21, No. 2, pp. 169-176 (1988).

Chang et al., *A Surface Acoustic Wave Sensor Modified From a Wireless Transmitter for the Monitoring of the Growth of Bacteria*, Sensors and Actuators, B 125, pp. 207-213 (2007).

Cho et al., *A 8-mW, 0.3 mm2 RF-Powered Transponder with Temperature Sensor for Wireless Environmental Monitoring*, Proc. Int'l Symp. Circuits and Systems (ISCAS), IEEE Press, pp. 4763-4766 (2005).

Crisman et al., *An Optical Device for Measuring Bending Strain to 5000 Microstrain and Compatible With Optical Fiber Installations*, IEEE Sensors Journal, vol. 5, No. 6, pp. 1321-1326 (Dec. 2005).

Gregory et al., *A Self-Compensated Ceramic Strain Gage for Use At Elevated Temperatures*, Sensors and Actuators, A 88, pp. 234-240 (2001).

Gregory et al., *High Temperature Stability of Indium Tin Oxide Thin Films*, Thin Solid Films, 406, pp. 286-293 (2002).

Gregory et al., *Piezoresistive Properties of ITO Strain Sensors Prepared with Controlled Nanoporosity*, Journal of The Electrochemical Society, 151 (8), pp. H198-H203 (2004).

Gregory et al., *Effect of Aluminum Doping on the High-Temperature Stability and Piezoresistive Response of Indium Tin Oxide Strain Sensors*, Thin Solid Films, 476, pp. 344-351 (2005).

Gregory et al., *Ceramic Temperature Sensors for Harsh Environments*, IEEE Sensors Journal, vol. 5, No. 5, pp. 833-838 (Oct. 2005).

Hashimoto et al, *Design and Fabrication of Passive Wireless SAW Sensor for Pressure Measurement*, IEEJ Transactions on Sensors and Micromachines, vol. 128, Issue 5, pp. 230-234 (2008).

Hines et al., *Passive Wireless Multi-Sensor Temperature and Pressure Sensing System Using Acoustic Wave Devices*, NASA STTR 2003 Solicitation.

Ikemoto et al., *Force sensor system for structural health monitoring using passive RFID tags*, Sensor Review, vol. 29, No. 2, pp. 127-136 (2009).

Jia et al., Wireless temperature sensor for bearing health monitoring, Smart Structures and Materials 2004: Sensors and Smart Structures Technologies for Civil, Mechanical, and Aerospace Systems. Edited by Liu, S. *Proceedings of the SPIE*, vol. 5391, pp. 368-376 (2004).

Kocer et al., *An RF Powered, Wireless Temperature Sensor in Quarter Micron CMOS*, Proceedings of the 2004 Internation Symposium on Circuits and Systems, 4 pages (2004).

Kocer et al., *Wireless Remotely Powered Telemetry in 0.25 mm CMOS*, Radio Frequency Integrated Circuits Symp., IEEE Press, pp. 339-342 (2004).

Lin et al., *Wireless temperature sensing using a passive RFID tag with film bulk acoustic resonator*, IEEE Ultrasonics Symposium, vol. 2, Issue 5, pp. 2209-2212 (2008).

Meijer, *Thermal Sensors Based on Transistors*, Sensors and Actuators, vol. 10, pp. 103-125 (1986).

Niska et al., *Chemical Vapor Deposition of Alpha Aluminum Oxide for High-Temperature Aerospace Sensors*, J. Vac. Sci. Technol., A 18(4), pp. 1653-1658 (2000).

Opasjumruskit et al., *Self-Powered Wireless Temperature Sensors Exploit RFID Technology*, IEEE Pervasive Computing, 5(1), pp. 54-61 (2006).

Suh et al., *Design optimization and experimental verification of wireless IDT based micro temperature sensor*, Proceedings of 2000 Smart Mater. Struct., 9, pp. 890-897 (2000).

Townsend et al, *Remotely powered, multichannel, microprocessor-based telemetry systems for smart implantable devices and smart structures*, Proc. SPIE, vol. 3673, pp. 150-156 (1999).

Varadan et al, *Design and Development of a Smart Wireless System for Passive Temperature Sensors*, Smart Materials and Structures, vol. 9, No. 4, pp. 379-388 (2000).

Wang et al., *A Passive Wireless Temperature Sensor for Harsh Environment Applications*, Sensors, 8, pp. 7982-7995 (2008).

International Search Report for PCT/US2011/036071, 3 pages, mailed Mar. 19, 2012.

Written Opinion for PCT/US2011/036071, 8 pages, mailed Mar. 19, 2012.

* cited by examiner

Sensor Top View

Sensor Side View

Top View

Side View

FIG. 11A Plan View Of Antenna With Diode

Plan View Of Sensor

| Temp (Deg C) | Measured Temp (Deg C) 10 dB Window |
|---|---|
| 25 | 25 |
| 150 | 145 |
| 200 | 208 |
| 250 | 231 |

FIG. 18B

| Freq (GHz) | Gain (dBi) (Measured) | Gain (dBi) (Corrected For Airgap)* |
|---|---|---|
| 2.10 | -21.1 | -23.6 |
| 2.70 | -15.4 | -18.8 |
| 3.90 | -13.6 | -17.9 |

WIRELESS TEMPERATURE MEASUREMENT SYSTEM AND METHODS OF MAKING AND USING SAME

CROSS-REFERENCE TO RELATED APPLICATION

This application is a continuation application of U.S. application Ser. No. 12/778,823, filed May 12, 2010, now U.S. Pat. No. 8,348,504, the entire contents of which are incorporated herein by reference.

STATEMENT REGARDING FEDERALLY SPONSORED RESEARCH OR DEVELOPMENT

The United States Government may have certain rights in this invention pursuant to SIBR Contract N68335-08-C-0267 awarded by the United States Navy.

FIELD OF THE INVENTION

This invention relates to sensors, and in particular to wireless sensors, components thereof, that may be used to determine the temperature and/or heat flux in harsh environments.

BACKGROUND OF THE INVENTION

Numerous methods and devices are known for measuring temperature. For example, the mercury thermometer has existed for hundreds of years. While the mercury thermometer may be acceptable for measuring the temperature of the human body, it faces limitations in effectiveness above certain temperatures and/or under dynamic or harsh conditions. Such conditions may include the interior of an internal combustion engine or on a moving blade of a gas turbine.

A gas turbine engine is an example of a device within which extremely high temperatures and harsh conditions prevail. Gas turbine engines may be used for various purposes, including propulsion and power generation. A typical gas turbine engine includes rotating and non-rotating components, such as the compressor, combustor and turbine sections of the engine, each of which operates in a different temperature range. In the turbine section of a gas turbine engine, the turbine blades are exposed to gases which may reach temperatures of 2500° to 3000° F.

Due to corrosion, mechanical and thermal degradation concerns, it is desirable to monitor the temperature of the surfaces of rotating and non-rotating components employed in gas turbines and other devices operating under harsh conditions. A number of techniques have been used to monitor the surface temperature of blades, vanes, combustors, discs etc. in gas turbine engines, including wire thermocouples, thin film thermocouples, infrared photography, pyrometry (including 3d pyrometry), thermographic phosphors and thermal paints. A common technique used in the aircraft engine environment employs embedded thermocouple wires in the blade or vane wall. However, embedding wires in the walls may cause significant structural and aerodynamic problems, including perturbing the flow of air used to cool blades and vanes. This perturbation may affect the boundary layer of air next to the blade and may adversely impact turbine performance.

Another embedded thermocouple technique, commonly referred to as "thermal spray thermocouples," employs plasma sprayed alumina or ROKIDE® (a registered trademark of Saint-Gobain Ceramic Materials, Latrobe, Pa.) ceramic coatings to encapsulate small diameter thermocouple wires on blades and vanes. Due to the thermal mass of the wires and associated ceramic insulator layer, such devices can introduce significant measurement error.

Infrared photography also has been used for surface temperature measurement. Infrared photography is a non-contact method in which thermal radiation patterns of an object are converted into a visible image. Such techniques are not easily transferable to the gas turbine engine environment for temperature monitoring, however, because smoke or other particulates may scatter the light. The extreme temperatures and velocities within a gas turbine engine also make it difficult to produce reliable infrared images. Pyrometry also may be used at a reasonably large distance from an object of interest in environments where the object of interest may be focused, however, the areas of the engine to be instrumented should be line-of-sight accessible. Additionally, adsorption by dust, windows, flames, gases and other optical interference can produce errors.

Yet another method to measure surface temperature is by using thermal paints. Thermal paints, also known as temperature indicating paints, provide a simple, effective and inexpensive way to obtain a visual record of the temperature distribution over the surface of components. Such paints can be applied to components having complex surface shapes, do not modify the thermal behavior of a component during testing, and can yield a visual display or thermal map of the component of interest. However, thermal paints typically exhibit poor adhesion and thus require special techniques to survive the harsh environment in gas turbine engines, such as described in U.S. Pat. No. 5,720,554 to Smith, et al., "Apparatus and method for the calibration of thermal paint." Other types of thermal paints having better adhesion are known, such as those described in Gregory et al, "Method of Preparing Ceramic Coatings for Temperature Measurement," U.S. Pat. No. 5,338,566 and Gregory et al, "Ceramic Coatings for Temperature Measurement," U.S. Pat. No. 5,135,795.

Thermographic phosphors also have been used to measure the surface temperature of turbine engine components. Thermographic phosphors rely on measurements of the rate of decay of the fluorescent response of an inorganic phosphor as a function of temperature. Once calibrated over a temperature range of interest, the phosphor is excited with a pulsed laser and the fluorescent decay is measured to calculate the temperature of the substrate. In many instances, only a small amount of material needs to be deposited onto the surface to provide an adequate fluorescent signal. Suitable phosphors are available to cover a wide range of temperatures and many of them are oxide ceramics that can withstand extremely high temperatures.

It is desirable to measure the temperature of the turbine blades while in operation, since such information is important to monitoring integrity of the blade for safety and maintenance reasons. The need for accurate surface temperature measurement becomes increasingly more important as operating temperatures in gas turbine engines are pushed to higher levels. Previously-known temperature measurement apparatus, however, are not ideal for use in measuring the temperature of an operating turbine blade for a number of reasons.

Thermocouples have been used for many years as temperature measurement sensors and continue to be developed for use in harsh environment. For example, U.S. Pat. No. 7,582,359 to Sabol et al., describes a common strategy for measuring temperatures on turbine blades by placing thermocouple sensors and connections (electrical leads or fiber optics) in "trenches" formed within a turbine vane. U.S. Pat. No. 3,006,978 to McGrath et al describes the use of thin film thermocouple conductors, U.S. Pat. No. 4,665,276 to Elbel et al describes a thermoelectric sensor and U.S. Pat. No. 4,779,994 to Diller et al describes a heat flux gage. As the heat resistant coating on the blade erodes, however, the trenches may become exposed and compromise the structural integrity of the blade. In addition, the relatively large thermal mass of the connectors and any associated insulation may introduce significant error in the measured temperatures.

While it has been proposed to attached thermocouple devices to a turbine blade using adhesives, the high temperatures, high velocities of gas impinging on the turbine blade and acceleration forces caused by rotation of the turbine vanes can make such methods of attachment problematic. In addition, although the thin film sensors may be non-intrusive, in that the sensor thickness is considerably less than the gas phase boundary layer thickness, such sensors still may suffer from limitations associated with providing trenches or other features needed to connect the sensors to the associated monitoring equipment.

Another disadvantage of previously-known sensing systems is the need for external power to sense and report temperatures. For example, U.S. Pat. No. 6,622,567, describes a system having a strain gage including a differentially variable reluctance transducer coupled with an RFID device, in which an external reader transmits energy to the device to enable the strain measurement, and communicate that measurement to the reader. Similarly, U.S. Pat. No. 7,474,230 to Blom et al. describes a system in which an RFID tag is coupled to a battery that powers a part of the circuitry of the RFID tag, including an RF communication block for receiving and transmitting RF signals. A sensor block including a frequency ratio digitizing temperature sensor alternately measures the ambient temperature and the voltage of the battery employed for the performing measurements.

J. H. Lin et al., "Wireless temperature sensing using a passive RFID tag with film bulk acoustic resonator", IEEE Ultrasonics Symposium, Volume 2, Issue 5, pp. 2209-2212 (2008), describes a passive RFID tag gathers power via inductive coupling from RF power for temperature sensing. The frequency of the oscillator varies with the temperature linearly in the range of 10 to 80 degrees Celsius at 2.48 GHz, thus enabling temperature to be determined by measuring the shift of oscillation frequency. However, the device described in that article is not suitable for use in a gas turbine environment. Similarly, G. Bergmann, et al., "Multichannel Strain Gage Telemetry for Orthopedic Implants," J. Biomechanics Vol. 21, No. 2, pp. 169-176 (1988), and C. Townsend, et al, "Remotely powered, multichannel, microprocessor-based telemetry systems for smart implantable devices and smart structures," Proc. SPIE, Vol. 3673, 150 (1999) describe strain gages that are remotely and continuously powered. L. K. Baxter, "Capacitive sensors design and Applications," IEEE Press, 1997, describes a device employing a microcontroller which produces a train of pulses or a single interrogation pulse to excite a capacitive limit switch, however, the circuit described in that article does not explain how to measure more than the two positions of the capacitor and does not provide temperature compensation.

K. Opasjumruskit et al, "Self-powered wireless temperature sensors exploit RFID technology," Pervasive Computing, IEEE, Volume 5, Issue 1, January-March 2006, pp. 54-61, describes a self-powered wireless temperature sensor that utilizes RFID technology in a CMOS batteryless device measures temperature and performs calibration to compensate for sensor imperfections. An RF link using passive RFID backscattering technique wirelessly transmits the data to a reading device while extracting power from the same signal, thus enabling the device to operate in a variety of environments. Wireless sensors employing CMOS transistor technology are described in Kocer et al, "An RF Powered, Wireless Temperature Sensor in Quarter Micron CMOS," Wireless Integrated Microsystems Engineering Research Center (WIMS-ERC), University of Michigan, Ann Arbor, Mich., as well as Gerard C. M. Meijer, "Thermal Sensors Based on Transistors," Sensors and Actuators, volume 10, pp. 103-125 (1986). None of the devices described in the preceding articles appear to be suitable for use in harsh environments such as combustion engines and gas turbines.

Y. Wang, "A Passive Wireless Temperature Sensor for Harsh Environment Applications," Sensors, vol. 8, pp. 7982-7995 (2008) describes a wireless temperature sensor reported to be suitable for use in harsh environments. That article describes a passive LC resonant telemetry system that relies on a frequency variation output, and which is integrated with a high dielectric constant-temperature sensitive ceramic material to measure temperature without contacts, active elements, or power supplies within the sensor. The article states that the device is capable of withstanding temperatures up to 235° C., but provides no information that the device would function effectively at significantly higher temperatures, such as those found in a gas turbine engine.

US Patent App. Pub. No. 20090147824 to Schafer et al, entitled "Wireless remote passive temperature sensor for monitoring food," also describes a passive wireless temperature sensor with a loop antenna reportedly capable of withstanding repeated exposure to temperatures of 500° F. (~260° C.). The article provides no information whether that device would function effectively at significantly higher temperatures, such as those found in a gas turbine engine, nor does it appear that this device would be suitable for use attached to a rotating turbine blade.

V K Varadan et al, "Design and Development of a Smart Wireless System for Passive Temperature Sensors," Smart Materials and Structures, Volume 9, No. 4, pp. 379-388 (2000), describes a passive surface acoustic wave (SAW) sensor that uses a special FM radar for transmitting and receiving FM electromagnetic signals. S. Ballandras at al, "Wireless temperature sensor using SAW resonators for immersed and biological applications", Ultrasonics Symposium, 2002, Proceedings, 2002 IEEE, Volume 1, pp. 445-448 (2002) discusses the possibility of measuring temperature using a passive wireless surface acoustic wave device. Similarly, S. Hashimoto et al, "Design and Fabrication of Passive Wireless SAW Sensor for Pressure Measurement," IEEJ Transactions on Sensors and Micromachines, Volume 128, Issue 5, pp. 230-234 (2008), describes the design and fabrication of a time division multiple access passive wireless pressure sensor using 2.45 GHz surface acoustic wave delay lines. None of the devices described in the foregoing references appear suitable for use in the gas turbine environment.

In view of the foregoing, previously-known temperature measurement systems and methods have a number of disadvantages which limit use of such systems in gas turbine engines and other harsh environments.

In particular, there exists a need for a temperature measurement system and methods wherein the sensor is sufficiently thin so as to not significantly effect the boundary layer of an operating turbine blade, but is sufficiently durable to withstand the extreme thermal and mechanical environmental conditions encountered in such applications.

It further would be desirable to provide temperature measurement systems and methods having a small footprint, mechanical mass and robust mode of attachment, so as not to introduce undesirable vibrational modes in the blades.

Additionally, it would be desirable to provide temperature measurement systems and methods having a small thermal mass so as not to obscure the actual surface temperature measurement, and which is capable of rapidly responding to temperature changes.

It still further would be desirable to provide temperature measurement systems and methods that exhibit high availability when employed in a gas turbine environment, and that avoid the need to provide a power supply on a rotating portion on the turbine.

It is also desired to provide temperature measurement systems and methods which provide a high degree of discrimination such that temperature changes are translated into a measurable quantity having sufficient magnitude that temperatures can be accurately determined.

It is further desired to provide temperature measurement systems and methods with the ability to communicate temperature measurements to another region, such as outside of a gas turbine engine.

SUMMARY OF THE INVENTION

The present invention is directed to temperature measurement systems and methods for use in harsh environments that are durable, have small mechanical and thermal mass, and which provide a high degree of temperature measurement sensitivity. The temperature sensors of the present invention also may be grouped to provide the ability to measure heat flux.

In accordance with one aspect of the present invention, a temperature sensor includes an antenna, a diode, and a dielectric layer disposed on the object of interest. The antenna includes a buried portion that extends through and is electrically coupled to the object of interest, and an exposed portion disposed upon an outer surface of the dielectric layer. The diode is coupled in parallel between the object of interest and the exposed portion of the antenna. The antenna is configured to receive interrogating signals from a transmitter, and to transmit response signals that are indicative of the measured temperature of the object of interest. The transmitter may emit either a wideband interrogating signal or a signal that is swept over a predetermined range of frequencies; both of which generate a voltage across a non-linear diode junction at the antenna resonant frequency. The diode produces harmonic frequencies that vary as a function of the temperature-dependent characteristics of the dielectric, and which are re-radiated by the antenna, along with the resonant frequency. A receiver detects the signals emitted by the temperature sensor and correlates the frequency of the response signal to a known temperature response of the dielectric material.

In accordance with another aspect of the invention, the temperature measurement system may include two or more temperature sensors, each attached to a separate object of interest, such as a turbine blade. In this embodiment, the two or more temperature sensors may be configured to transmit response signals that differ from one another, so that the receiver can discriminate between the signals and determine which response signal, and thus temperature measurement, corresponds to each of the two or more temperature sensors. In such embodiments, the antenna lengths and/or dielectric thicknesses may be different for different temperature sensors. In addition, two or more transmitters, and/or receivers, may be provided to transmit signals to, and receive RF signals generated by, the two or more temperature sensors. Alternatively, a single transmitter and receiver may communicate with two or more temperature sensors using different wideband or swept frequencies during consecutive time intervals in a time-division multiplexed manner.

For embodiments of the inventive temperature measurement system suitable for use in gas turbine environments, the dielectric may be attached to or deposited upon a turbine blade, and preferably has a thickness less than 0.25 mm, and more preferably less than 0.04 mm. Suitable materials for use as the dielectric include yttria-stabilized zirconia, aluminum oxide, hafnia, magnesia or magnesium aluminate spinel. Temperature sensors comprising such materials are expected to operate for extended periods at temperatures above 1000 degrees Celsius and to provide robust performance at temperatures in a range of 250 degrees to 1200 degrees Celsius. Of course, temperature sensors in accordance with the invention are not limited to this range, and may also be used at room temperature and at temperatures as high as 1400 degrees Celsius.

Materials suitable for forming the antenna for use in gas turbine environments may comprise platinum, palladium, rhodium or iridium, and has its buried portion coupled to the turbine blade, which acts as a ground. The distance between the exposed portion of the antenna and the ground depends upon the thickness of the dielectric material, and preferably is less than 0.25 mm, and more preferably less than 0.04 mm.

In preferred embodiments, the diode may comprise an aluminum-doped zinc oxide layer, and may be formed, together with some or all of the other components of the temperature sensor, by direct deposit of material on the turbine blade, for example, using thin film lithography techniques.

In accordance with the present invention, embodiments of the inventive system and methods for use in gas turbines preferably have a small footprint, low mass relative to the mass of the turbine blade, and thicknesses less than the gas phase boundary layer thickness, so that gas flow through the engine is not adversely affected by the profile of the sensor. Advantageously, embodiments of the temperature sensors also have low mass when compared to wire thermocouples. Such embodiments also preferably possess low thermal mass to facilitate a rapid response and avoid disturbing the convective heat transfer characteristics.

Preferred embodiments of the present invention suitable for use in gas turbines also are sufficiently rugged to withstand harsh environmental conditions and include a reliable and robust sensor-to-the blade-attachment mechanism. Such temperature measurement systems and methods preferably exhibit high availability, high temperature measurement sensitivity, and do not include active elements or need to be continuously powered. In some embodiments, temperature measurement systems and methods permit the ability to communicate temperature measurements to another region, such as outside of a gas turbine engine.

Methods of using and making the inventive temperature system also are provided.

BRIEF DESCRIPTION OF THE DRAWINGS

FIGS. 11A and 11B depict a plan view and a cross-sectional view, respectively, of a thin film temperature sensor in accordance with an embodiment of the invention.

FIGS. 18A and 18B are graphical and tabular results, respectively, of an example of the performance of a temperature sensor in accordance with an embodiment of the invention.

FIG. 20 is a table showing the exemplary results of performance of an antenna in accordance with an embodiment of the invention.

DETAILED DESCRIPTION OF THE INVENTION

Figure 1:
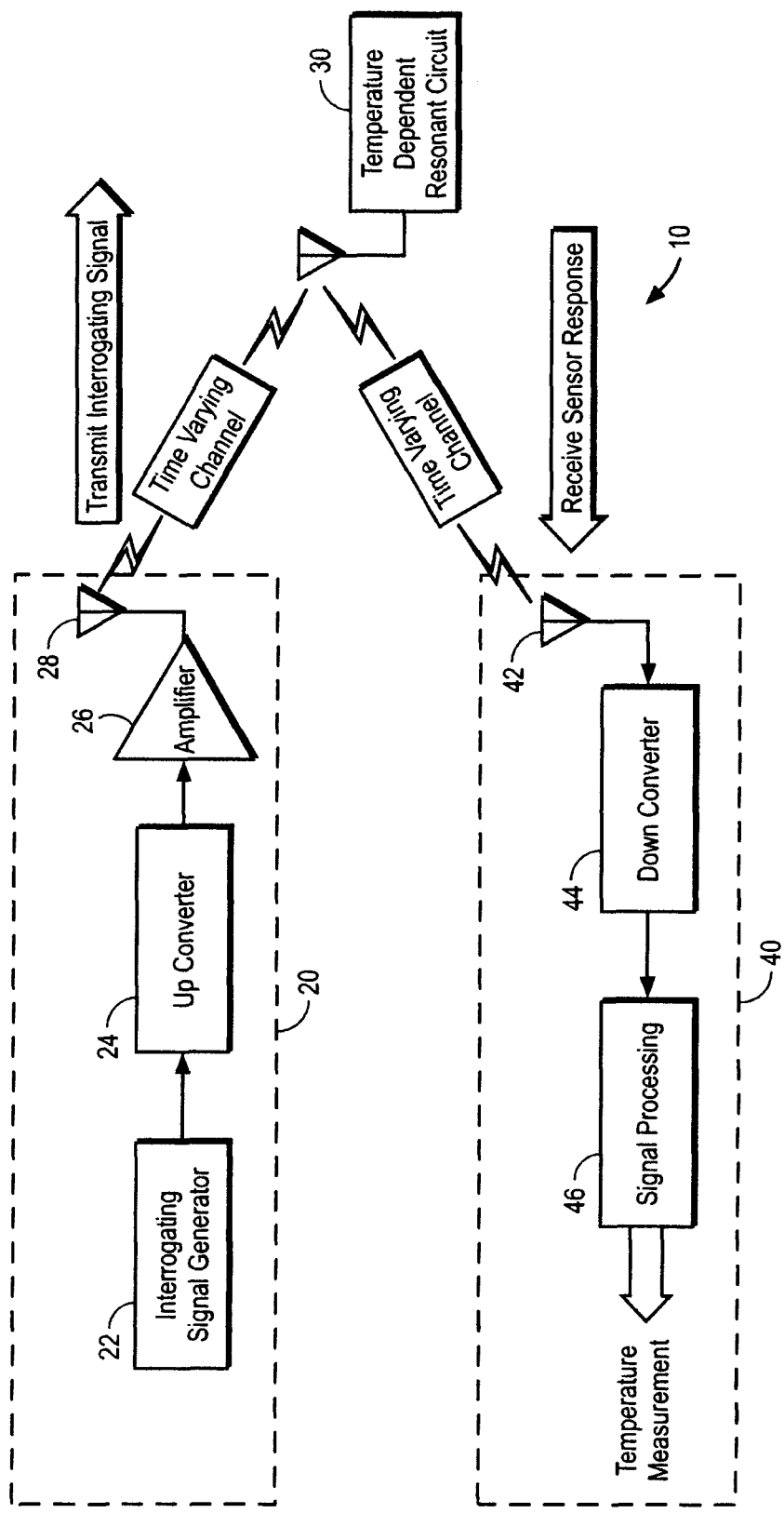
FIG. 1 schematically illustrates transmitter, receiver and temperature sensor components of the temperature measurement system of the present invention.

The present invention provides wireless sensor systems and methods of use and manufacture thereof, suitable for use in harsh environments, such as in an internal combustion engine, in a reactor, or in a gas turbine engine. Preferred embodiments may be capable of operating at temperatures exceeding 1200 degrees Celsius for extended periods of time, and also may be capable of operating in environments where high temperatures, high gas velocities, and high acceleration loadings are encountered. Of course, the invention is not limited to use in such environments, and may be utilized for measuring relatively low temperatures.

Some previously-known strain sensors rely on Wheatstone Bridge-based resistive measurements, and some previously-known temperature sensors rely on the thermoelectric effect or the Seebeck effect, which is a voltage measurement. In contrast, the temperature measurement system constructed in accordance with the principles of the present invention include a frequency-shift induced measurement. Further, while some previously-known sensors send electromagnetic energy to a gauge or RFID to temporarily power the device, in the present invention interrogation signals are received and re-radiated with encoded information.

Advantageously, the temperature sensors employed in the present invention are expected to have a dielectric with a large temperature coefficient of dielectric constant, such that there is a relatively significant change in dielectric constant with temperature over a relatively large temperature range, e.g., from room temperature to 1400 degrees Celsius. This temperature range constitutes a vast improvement over previously-known temperature sensors described in the published literature that are capable of operating only at temperatures less than 235 degrees Celsius.

Moreover, although wire connected indium-tin-oxide (ITO) based thin film thermocouples have been used for temperature measurement in some turbine engines, the electromotive force ("emf") of such thermocouples change with temperature due to the Seebeck effect, which is an order of magnitude larger in semiconductors than in metals. The change in emf in such previously-known systems typically is monitored using wires that coupled to a slip ring or telemetry system, and then transmitted to a data acquisition system located outside of the engine environment. These electrical devices typically require wires to get the signal from the engine environment to the data acquisition system for data collection and analysis.

While ITO thermocouples typically have a much larger thermoelectric potential (TEP) and do not suffer from the low signal-to-noise ratios that may plague slip ring technology, the thermoelectric response of semiconductor thermocouples depends largely on the charge carriers available as a function of temperature. This is in contrast to the metal/alloy based thermocouples where the available charge carriers typically decrease with temperature. Thus, the thermoelectric response of ITO based thermocouples is typically 1-2 orders of magnitude greater than those observed in metals. However, such thermocouples utilize lead wires to take the signal from the sensor to the outside world and makes the measurement expensive and cumbersome, even with the larger thermoelectric powers possible with the ITO based thermocouples. Accordingly, the passive wireless temperature sensors provided by the present invention eliminate the use of slip rings, and are attractive from the viewpoint of cost and complexity of the measurement. In some embodiments of the present invention, multiple blades and perhaps every blade on a turbine can be instrumented, thereby providing enhanced monitoring of the integrity of the turbine.

In accordance with one aspect of the present invention, temperature measurement systems are provided wherein individual system components communicate wirelessly. In some desired embodiments, a passive wireless temperature sensor is provided that translates a temperature change measured from an object of interest into a well-characterized shift in dielectric constant, which is used to modify the frequency of a response signal. The temperature measurement systems of the present invention are particularly useful in measuring the temperature on the surfaces of rotating and non-rotating components in gas turbine engines. In such environments, conventional wired thermocouples may have too large a thermal mass for reliable surface temperature measurement and/or the routing of conventional wired thermocouples from the desired location to the data acquisition system to complete the measurement is either undesirably expensive or may result in compromised integrity of the underlying structure. In some embodiments of the invention, temperature may be measured over a limited temperature range, and may include a dielectric tuned for maximum response and sensitivity within that range.

Wireless sensor systems in accordance with embodiments of the present invention include a transmitter configured to send an interrogating signal, a sensor configured to receive the interrogating signal and respond by transmitting a response signal, and a receiver for receiving and processing the response signal. Based on the analysis of the received response signal, a determination of the temperature may be made. The system of the present invention may be advantageously employed, for example, in a jet engine, as the temperature sensor requires no direct power source, and data can be remotely accessed when on demand. The present invention thus may be used to monitor the safety and integrity of a jet engine.

Figure 2A:
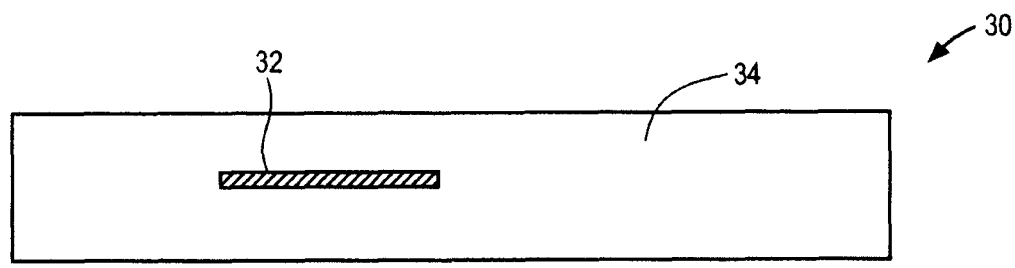
FIGS. 2A and 2B depict top and side views, respectively, of a temperature sensor constructed in accordance with principles of the present invention.
Figure 2B:
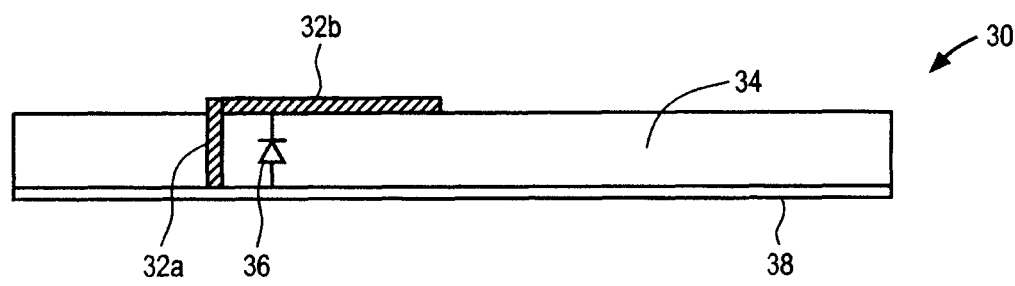

Referring now to FIGS. 1 and 2, components of an exemplary embodiment of passive wireless temperature measurement system 10 constructed in accordance with the present invention are described. System 10 includes temperature transmitter 20, temperature sensor 30 and receiver 40. Transmitter 20 includes signal generator 22, upconverter 24, amplifier 26 and antenna 28. Receiver 40 includes antenna 42, downconverter 44 and signal processing unit 46. As will of course be apparent to one of ordinary skill in the art of electronics design, transmitter 20 and receiver 40 may be housed with a single or multiple enclosures.

As shown in FIG. 2, temperature sensor 30 comprises antenna 32, dielectric layer 34 and diode 36, all disposed on and electrically coupled to substrate 38, illustratively a turbine blade, that serves as a groundplane for system 10. Antenna 32 includes buried portion 32a that extends through dielectric layer 34, and exposed portion 32b that is disposed on, or embedded in, the surface of dielectric layer 34. Diode 36 is disposed between and in electrical contact with substrate 38 and the exposed portion of antenna 32b.

In operation, signal generator 22 generates an interrogation signal that is upconverted by upconverter 24 to a frequency in a range corresponding to a resonant frequency of the temperature sensor 30. Depending upon the specific dimensions of the temperature sensor and materials, the upconverted interrogation signal may be in a range of 100 kHz to 10 GHz. The resulting signal is amplified by amplifier 26 and supplied to antenna 28 for transmission to temperature sensor 30. The interrogation signal may be one of several types, including a wideband signal having frequencies expected to encompass the resonant frequency of temperature sensor 30, or a time-varying signal that is swept through a range of frequencies expected to encompass the resonant frequency of the temperature sensor 30.

Temperature sensor 30 includes dielectric layer 34 having a temperature-dependent dielectric constant, which characteristic may used to estimate the temperature at sensor 30. In particular, temperature sensor 30 constitutes a resonant circuit comprising antenna 32 and dielectric layer 34 that separates the antenna from substrate 38, such as an exterior metal surface of a gas turbine engine blade. The dielectric constant of dielectric layer 34 varies with temperature and causes a corresponding change in the resonant frequency of the temperature sensor. Accordingly, when energized by the interrogation signal, antenna 32 of temperature sensor 30 re-radiates a response signal at a resonant frequency and harmonics determined by the temperature response of dielectric layer 34.

The response signal is transmitted through a time varying channel and is received via antenna 42 of receiver 40, downconverted using downconverter 44 and analyzed by signal processor 46 to generate a temperature measurement value. Signal processor 46 may comprise a specially-programmed general purpose computer or application specific integrated circuit and processor. The temperature measurement value is determined by the downconverted response signal by translating the frequency shift of the response signal into a measured temperature value using a predetermined relationship between frequency and dielectric constant for that temperature sensor.

Figure 3:
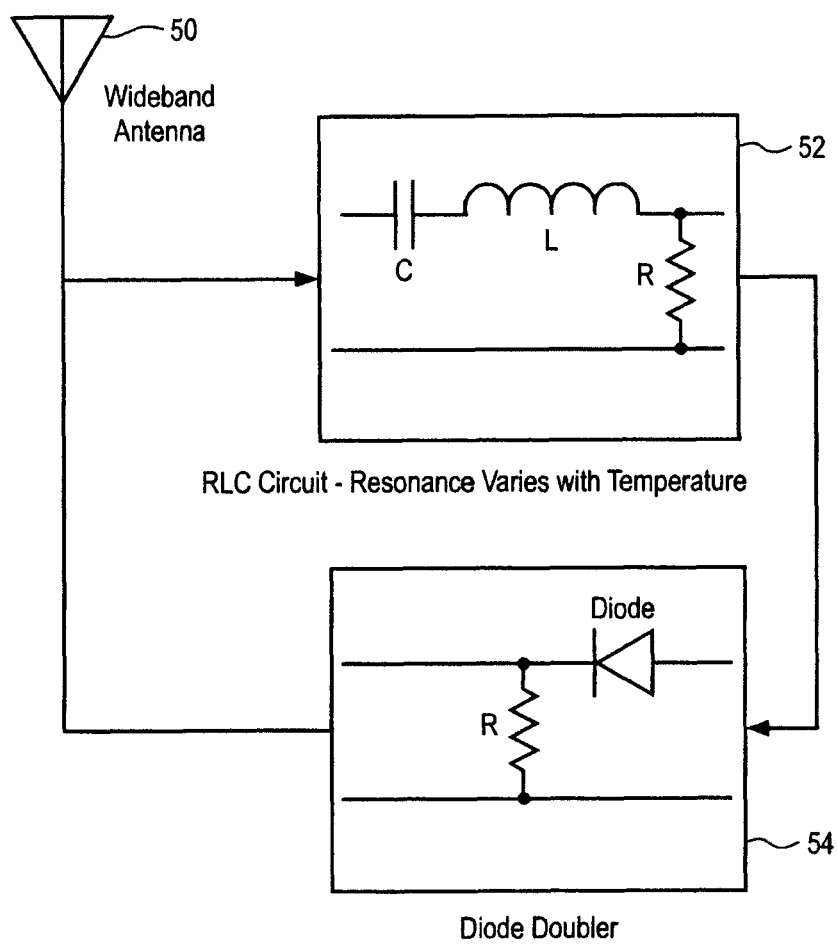
FIG. 3 depicts an equivalent circuit of a temperature sensor of the present invention.

FIG. 3 schematically depicts an equivalent circuit of the temperature sensor shown in FIG. 2, in which wideband antenna 50 is coupled to resonant circuit 52, which is coupled to diode doubler circuit 54. More specifically, antenna 50 receives the interrogation signal from transmitter 20 and communicates that signal to resonant circuit 52 of the equivalent circuit. The center frequency of resonant circuit 52 varies with temperature. Resonant circuit 52 thus passes only that portion of the interrogation signal containing frequencies close to, or at, the center frequency of the resonant circuit; energy associated with the non-resonant frequencies is blocked. The passed energy is coupled to diode frequency multiplier circuit 54, which generates harmonics of the passed frequencies. The temperature-dependent response signal, corresponding to the resonant frequency and its harmonics, are re-radiated by antenna 50 to receiver 40, as described with respect to the embodiment of FIG. 1. The harmonics received by the receiver thus enable discrimination between the response signal and the interrogation signal, after which a value indicative of the measured temperature may be derived using a predetermined relationship between temperature and frequency for that temperature sensor.

Figure 4:
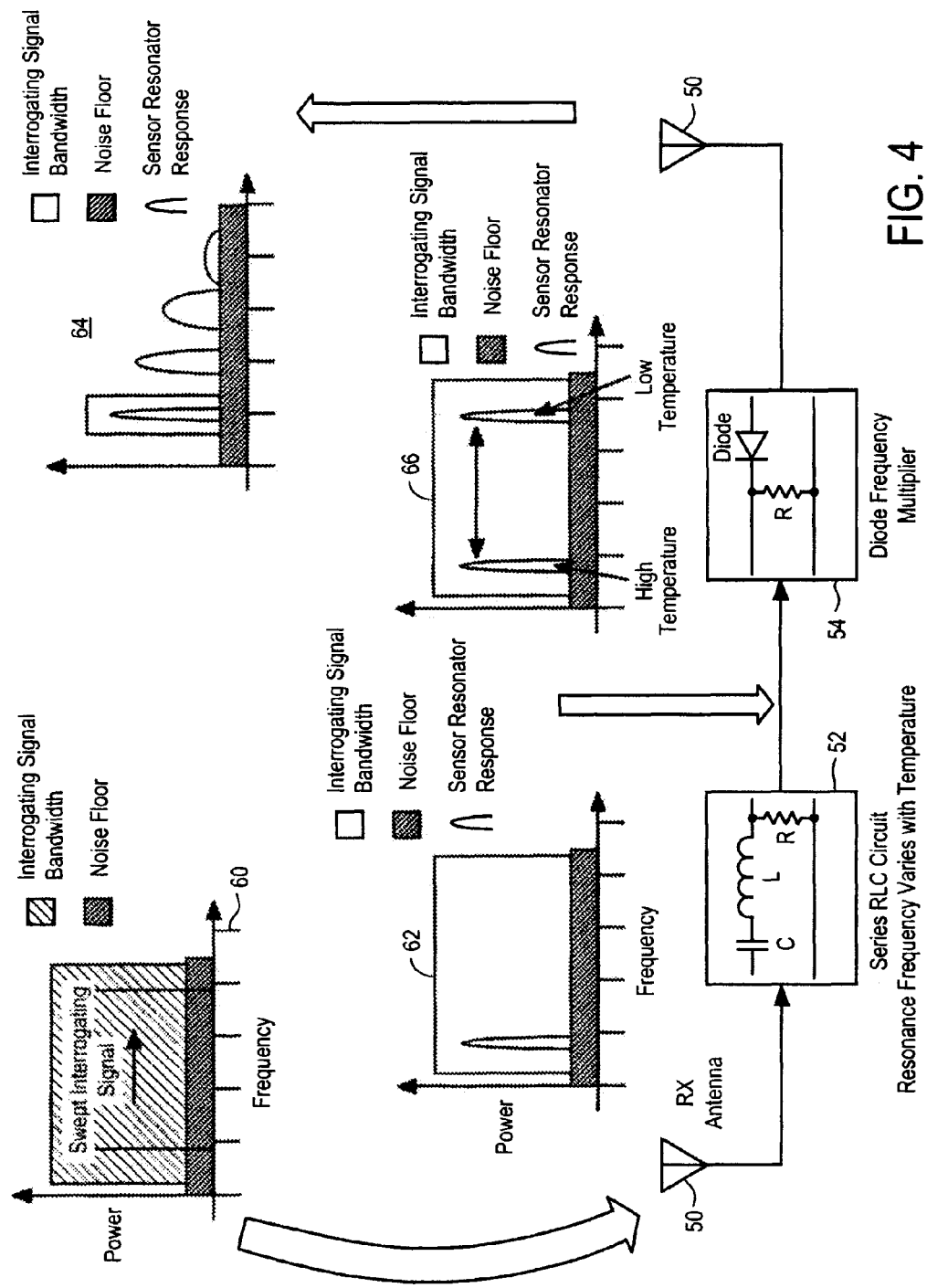
FIG. 4 illustrates operation of a system in accordance with an embodiment of the present invention.

Referring now to FIG. 4, a schematic view of exemplary signals employed in the temperature measurement system of the present invention is described. In this embodiment, swept interrogation signal 60 transmitted by the transmitter covers all expected sensor resonant circuit center frequencies. Preferably, the frequency of the sensor resonator response is predicted, and signal 60 is selected so that the predicted frequency of the resonator response is within the range of signal 60. Signal 60 is received by antenna 50 of the equivalent temperature sensor coupled to resonant circuit 52, which passes the portion of interrogation signal 60 containing frequencies at and near the center frequency of the circuit to diode frequency multiplier 54. As discussed above, diode multiplier 54 creates harmonics of resonant frequency signal 62 and radiates that composite response signal 64, including the center frequency and second and higher harmonics, via antenna 50. Response signal 64 received by the receiver may include noise, transmitted interrogation signal 60, fundamental resonant circuit passed signal 62, and the harmonics created by the diode multiplier circuit. These functions are performed by a passive microwave circuit. The signal processing algorithms in the receiver isolate a harmonic signal, preferably at least the second harmonic due to its relatively high power, and estimate the temperature by comparing the measured RF frequency to a predetermined relation between the resonant frequency and temperature for that temperature sensor. As indicated in FIG. 4, the temperature dependence of the dielectric constant of the dielectric layer causes a shift in the center frequency of the temperature sensor, such that at low temperature the center frequency increases and the center frequency decreases at higher temperature, as indicated at 66.

An application for which the temperature sensors of the present invention are particularly well-suited is for measuring temperature of a gas turbine engine. In such a system, thin film wireless temperature sensors may be attached to a turbine blade to measure temperature, and send signals to an outside instrumentation system (desirably including a transceiver, signal processing devices, and digital input/output connections to external temperature measurement users). The temperature sensor may be directly incorporated into the substrate of the turbine blade such that the RF circuitry is embedded into the substrate by a combination of plasma sprayed dielectrics and small diameter wires. Accordingly, the sensor has a very low profile and will not adversely affect gas flow.

Figure 5:
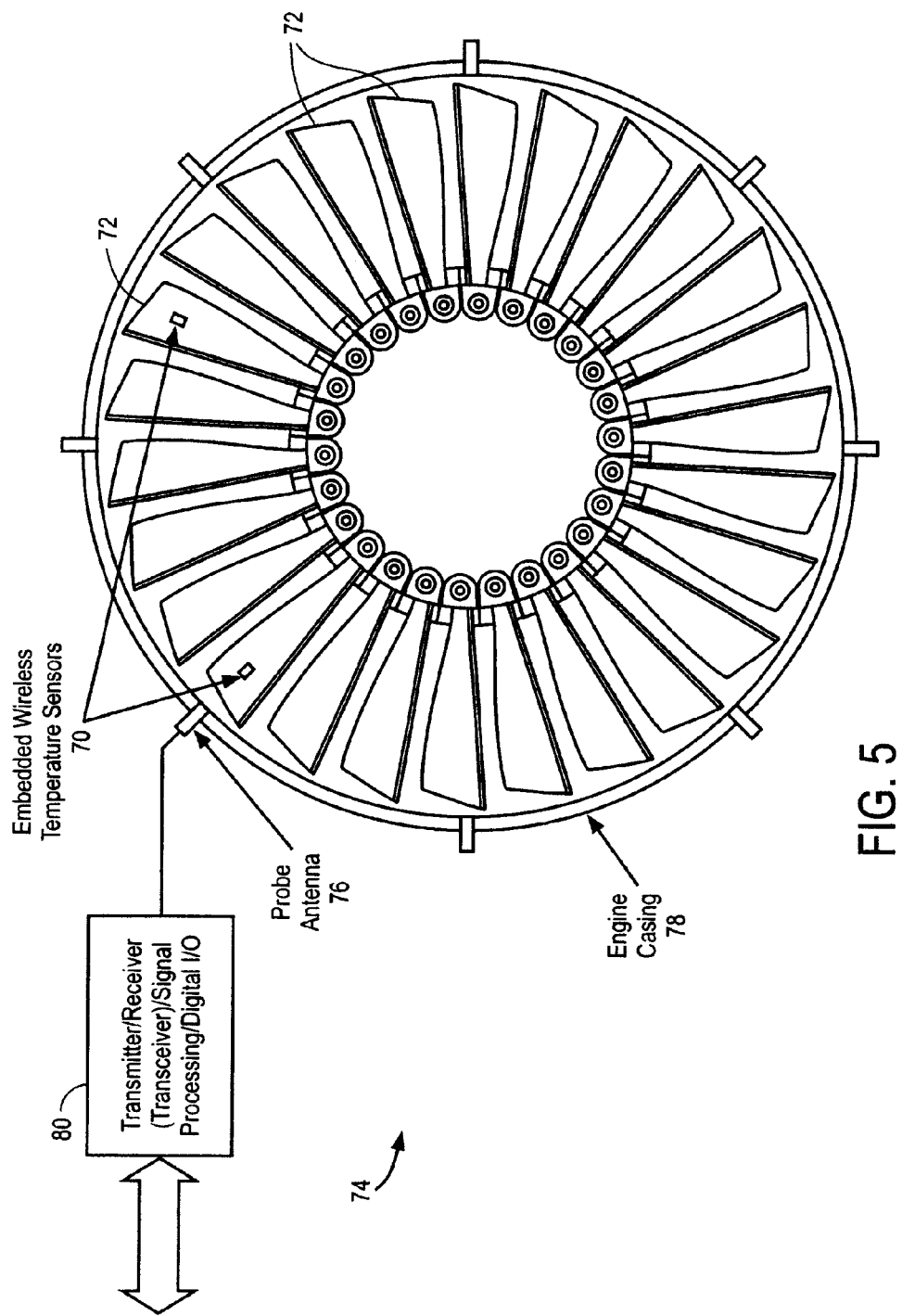
FIG. 5 depicts an embodiment of the present invention to measure temperatures of turbine blades within a gas turbine engine.

Referring to FIG. 5, an exemplary embodiment of the invention wherein a plurality of temperature sensors 70 are affixed a plurality of blades 72 of turbine 74 is described. One or more probe antenna 76 are attached to engine casing 78 to communicate with sensors 70. Antenna 76 also is in communication with transceiver 80, which includes a transmitter and receiver as discussed above with respect to FIG. 1. Illustratively, the system may include a single transceiver 80, a single antenna 76, and multiple sensors 70. In such embodiments, it may be desirable to configure sensors 70 so that the response signal generated by each sensor 70 may be distinguished from the response signals of other sensors, for example, by varying the lengths of the antennas. Alternatively, multiple sensors having different resonant center frequencies may be configured to communicate with multiple transceivers.

In the embodiment of FIG. 5, sensors 70 preferably have low thermal mass and are fabricated using thin film lithography and thin film deposition techniques. Advantageously, sensors 70 may be deposited directly onto a turbine blade without significantly affecting the balance of the blade or the gas flow path through the engine. The low thermal mass associated with such thin film temperature sensors also enables rapid thermal response with reduced measurement error. One of skill in the art will appreciate that thick film sensors, as described below, also would be suitable for this application.

Figure 6:
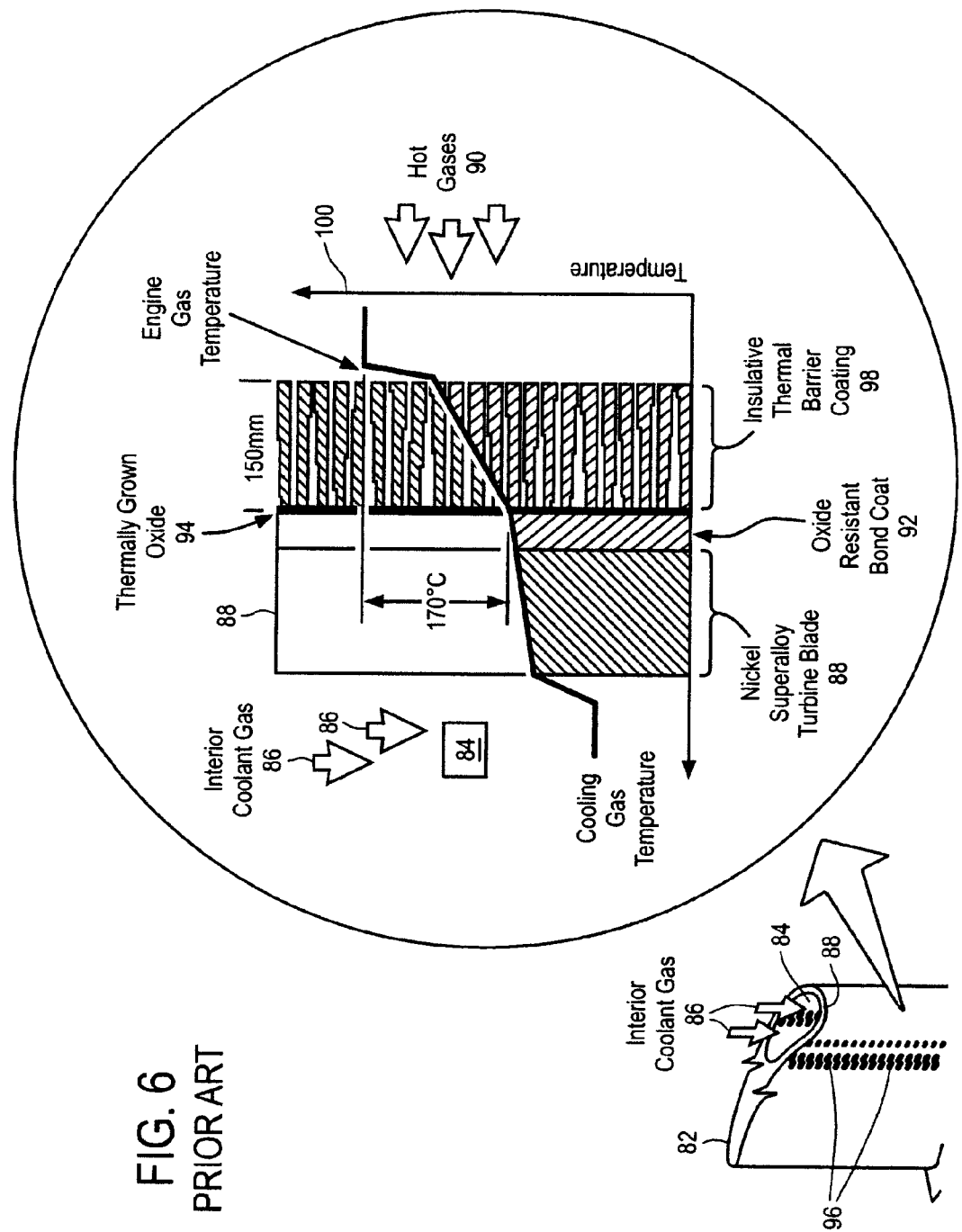
FIG. 6 illustrates the thermal relationships of various components of a previously known turbine blade configuration.

Referring now to FIG. 6, construction of a conventional turbine blade is described as a context for one application of the temperature sensor of the present invention. Blade 82 includes passage 84 through which coolant gas 86 is directed to help prevent overheating of blade 82. Wall 88 of blade 82 is exposed to coolant gas 86 on one side and hot gases 90 of the operating environment on the other. Oxidation resistant bond coat 92 and thermally grown oxide 94 are disposed on wall 88 of the blade to protect it from hot gases 90. Coolant gases 86 pass through channels 96 which extend through wall 88, bond coat, 92 and oxide 94 and form a thermally insulating layer 98. Layer 98 keeps the temperature of wall 88 lower than that of the operating environment and hot gases 90, as indicated by graph 100. One preferred location for a temperature sensor of the present invention is embedded in bond coat 92, which comprises a ceramic.

Figure 7:
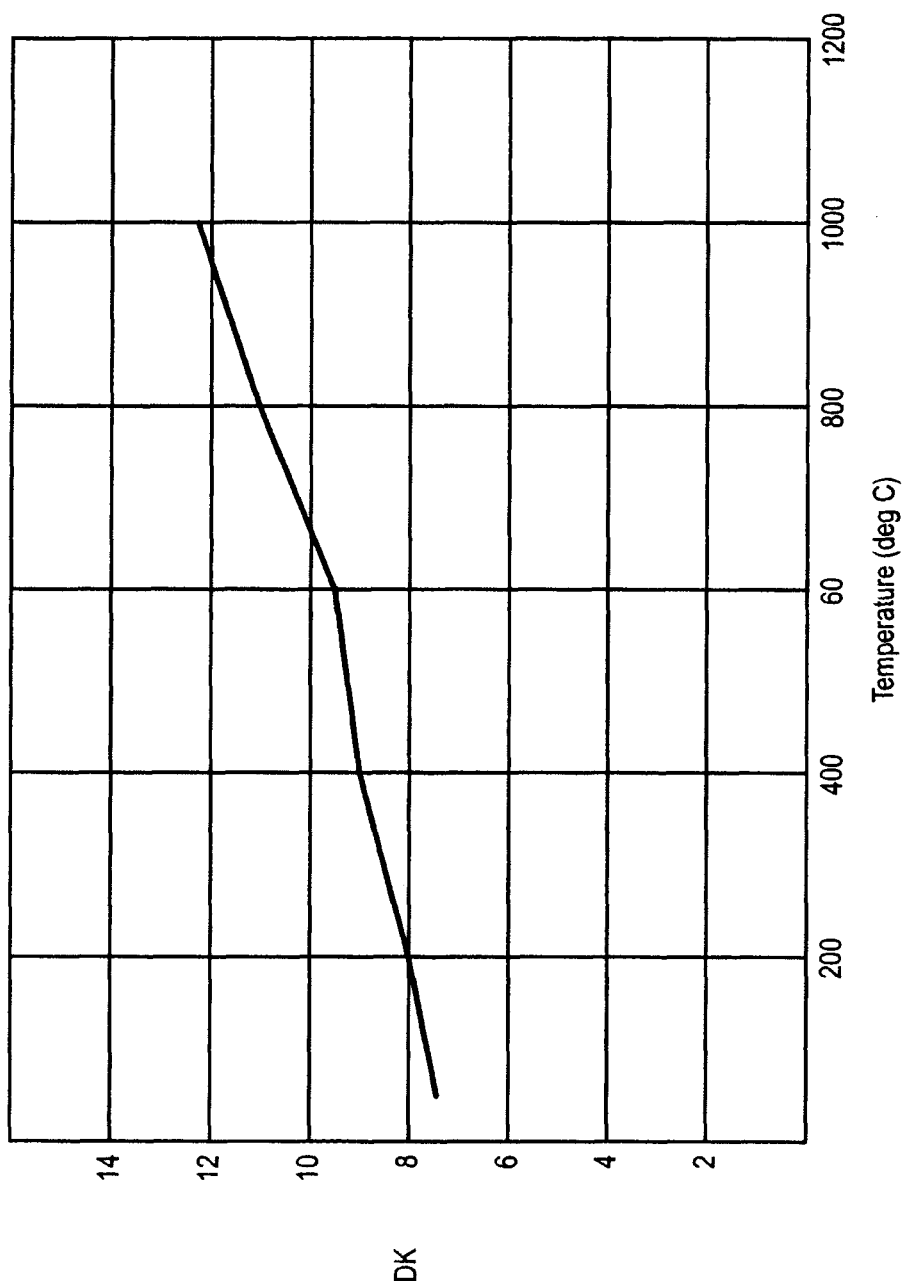
FIG. 7 illustrates the relationship between the dielectric constant of alumina as a function of temperature.

One known coating for turbine blades is alumina. Alumina has a dielectric constant (DK) that varies with temperature as depicted in FIG. 7, such that the dielectric constant increases monotonically with temperature from about room temperature to 1100 degrees C. Thus, given a value of the dielectric constant of alumina, one can readily determine a corresponding temperature. Advantageously, the temperature coefficient of dielectric constant (TCDC) of microplasma-sprayed alumina is sufficiently large to allow small changes in temperature to produce measurable changes in the response signal generated by the temperature sensor. Thus, microplasma-sprayed alumina may be a desirable dielectric material for use in making the temperature sensors of the present invention.

Figure 8:
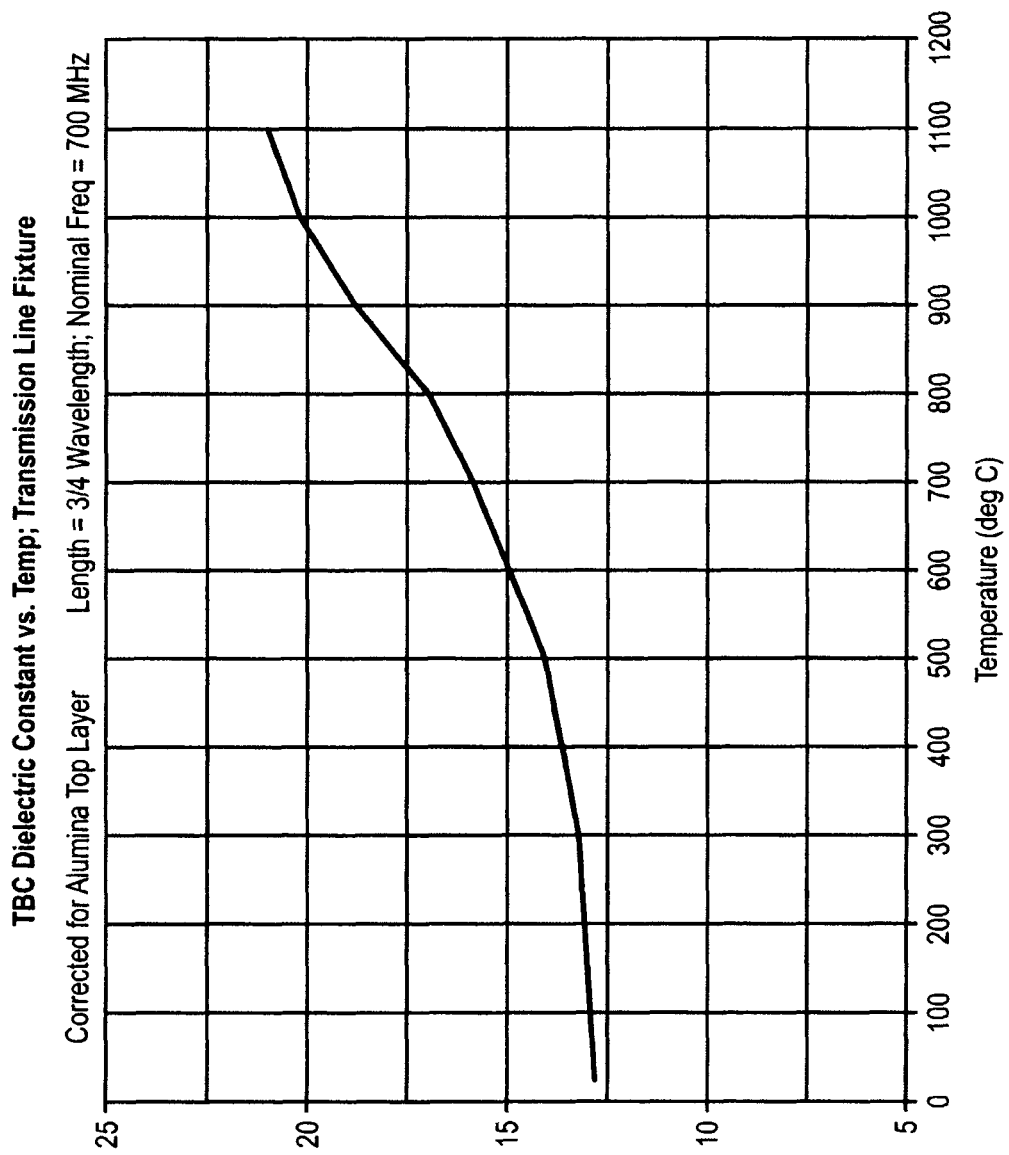
FIG. 8 illustrates the relationship between the dielectric constant of dielectric thermal barrier coatings as a function of temperature.

Another known coating for turbine blades is a dielectric referred to as "thermal barrier coating" or TBC dielectric. FIG. 8 depicts the variation of dielectric constant (DK) for TBC dielectric as a function of temperature, such that the dielectric constant of TBC dielectric increases monotonically with temperature. Thus, like alumina, knowing the dielectric constant of TBC dielectric, one can determine the corresponding temperature. In addition, if the alumina or TBC dielectric is in close communication with another material, such as a turbine blade, the temperature of the turbine blade may be determined using other temperature relationships illustrated in graph 100 of FIG. 6.

In a preferred embodiment, an antenna of a wireless temperature sensor has adequate gain and quality factor (Q). Q is a measure of the bandwidth of the antenna response and is defined as:

$Q$=Antenna Center Frequency/Antenna Bandwidth

Preferably, the antenna gain is sufficient to receive the interrogating signal, excite the resonant circuit, generate harmonics in the diode, and generate a response signal to the transceiver that is of sufficient strength to allow measurement of its center frequency. The antenna Q has a first order affect on the measurement accuracy of the response signal center frequency. Higher Q values (narrower response) produce better measurement resolution and accuracy. Micro-gap antennas with gain greater than −30 dBi, and Q values greater than 20 are adequate to produce a temperature sensor system with an accuracy of 10 degrees Celsius.

Referring again to FIG. 2, antenna 32 is expected to be an efficient, provided the substrate material is low-loss. The resonant frequency of antenna 32 is linearly proportional to the length of the radiating strip. Dielectric layer 34 separating antenna 32 from substrate 38 preferably is stable over the desired operational temperature range of the sensor, and as depicted in FIGS. 7 and 8, preferably possesses a dielectric constant that varies monotonically with temperature. Dielectric layer 34 preferably also has low electrical loss at the resonant frequency chosen for the temperature sensor. Yttria stabilized zirconia (YSZ) used as a thermal barrier coating for gas turbine engine blades in the hot section of the engine, as well as plasma-sprayed aluminum oxide, possess such desired characteristics with a desired temperature range and either may be desired in some embodiments. In other embodiments, microplasma-sprayed aluminum oxide, zirconium oxide, hafnium oxide, hafnia, magnesia or magnesium aluminate spinel or a combinations thereof may be used. As will be recognized by one of ordinary skill, plasma-sprayed alumina may be undesirable in some applications because it may not be readily deposited directly onto a superalloy substrate in the event that the coefficient of thermal expansion mismatch is large. In that case, it may be desirable to deposit a bond coat consisting of NiCoCrAlY onto the superalloy substrate prior to the deposition of the dielectric.

Diode 36 of temperature sensor 30 serves as a frequency multiplier and generates the harmonics of the temperature sensor resonant frequency that can be readily separated from the interrogation signal by the receiver. The desired characteristics of a preferred high temperature diode are that it is capable of stable operation over the operational temperature range of the sensor and that it produces harmonics at the frequencies of interest. Preferred embodiments of diode 36 have a nitrided layer and a non-nitrided layer. Of particular use as diode 36 of the present invention is a Schottky diode described with reference to FIG. 9.

Figure 9:
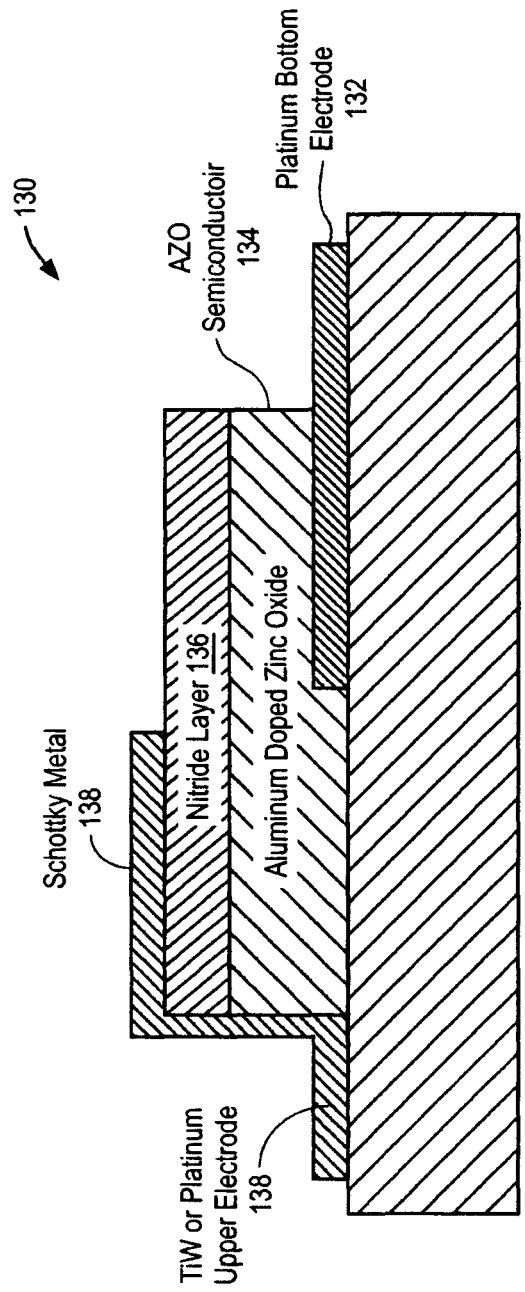
FIG. 9 depicts the structure of a high temperature diode constructed in accordance with an embodiment of the invention.

Referring now to FIG. 9, a preferred embodiment of diode 130 includes conformal coatings of stacked thin films including bottom electrode 132, which preferably comprises platinum or palladium. Diode 130 also includes layer 134, which preferably is a semiconductor layer comprising zinc oxide, alumina doped zinc oxide (AZO), indium doped zinc oxide (IZO), tin oxide, indium oxide, or combinations thereof often referred to as ITO. Diode 130 preferably includes layer 136, which comprises nitride (such as nitrided zinc oxide or nitrided aluminum doped zinc oxide), and top layer 138, which comprises a Schottky metal such as silver or vanadium that is subsequently annealed to form vanadium nitride and covered with layers of platinum, platinum:rhodium alloys, palladium, or other refractory metal. Platinum, palladium and rhodium tend to form ohmic (high work function) contacts to AZO, whereas vanadium nitride tends to form Schottky (low work function) contacts to AZO. In a preferred embodiment, thin film stack diode 130 is directly deposited onto an ultrafine grain sized alumina coating which is microplasma-sprayed onto a bare superalloy substrate prior to the deposition of other elements of the wireless temperature sensor. Sputtered platinum interconnects may connect the sensor antenna or diode 130 to the ground plane.

It will be appreciated that the operational temperature range of temperature sensors in accordance with the invention may be limited due to the substrate. In some preferred embodiments, the superalloy substrate is nickel-based or cobalt-based. Nevertheless, use of some such embodiments may be limited by the melting point of the superalloy materials. One of skill will appreciate, however, that other preferred embodiments may include substrates formed of other materials to allow for operation at higher temperatures beyond the material limitations of nickel-based or cobalt-based superalloy substrates. For example, ceramic matrix composites (CMCs) may be used as the high temperature substrates, as well as monolithic yttria stabilized zirconia ceramic plates and coatings such as those used in the afterburners of military jet engines. In such embodiments, the operational temperatures of the wireless sensors can reach 1400 degrees Celsius.

Figure 10A:
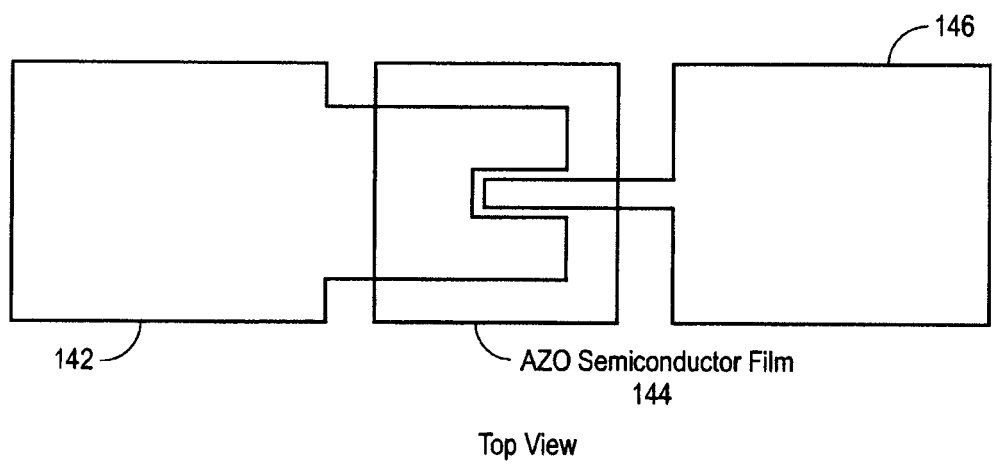
FIGS. 10A and 10B depicted top and side views, respectively, of a high temperature diode in accordance with an embodiment of the invention.
Figure 10B:
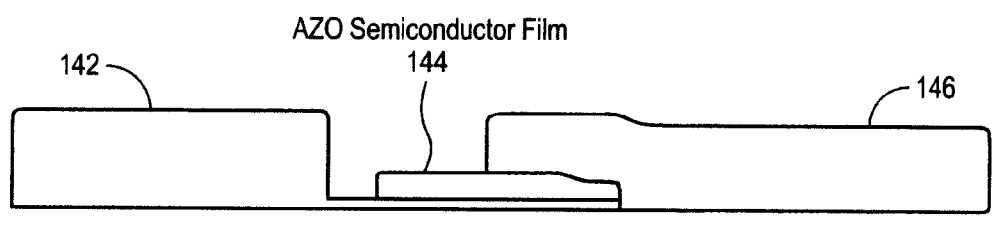

An alternative embodiment of a diode suitable for use in the temperature sensor of the present invention is described with respect to FIGS. 10A and 10B. Diode 140 includes layer 142, which preferably comprises platinum or palladium, layer 144, which includes an AZO semi-conductive film with a nitride coating, and layer 146, which comprises vanadium, which forms a low work function vanadium nitride layer after heat treatment and is subsequently covered by platinum or palladium. Diode 140 is similar to diode 130 but includes an interdigitated design when viewed in plan. The architecture of diode 140 preferably includes thicker semiconductor films in the diode structure, which may improve high temperature stability and operation.

Figure 11B:
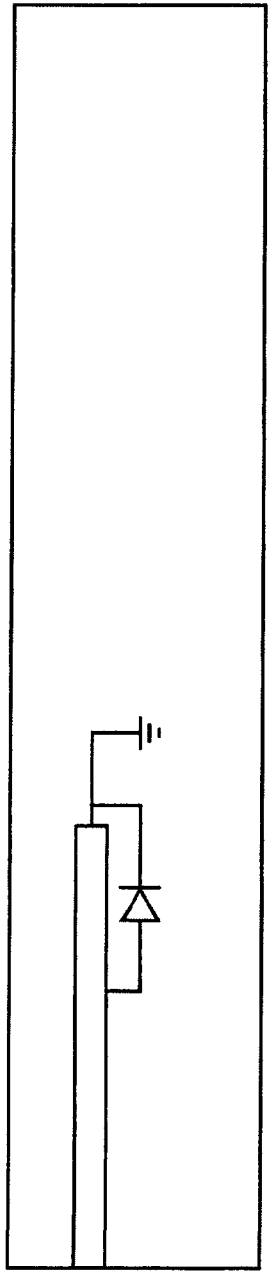
Figure 11B:
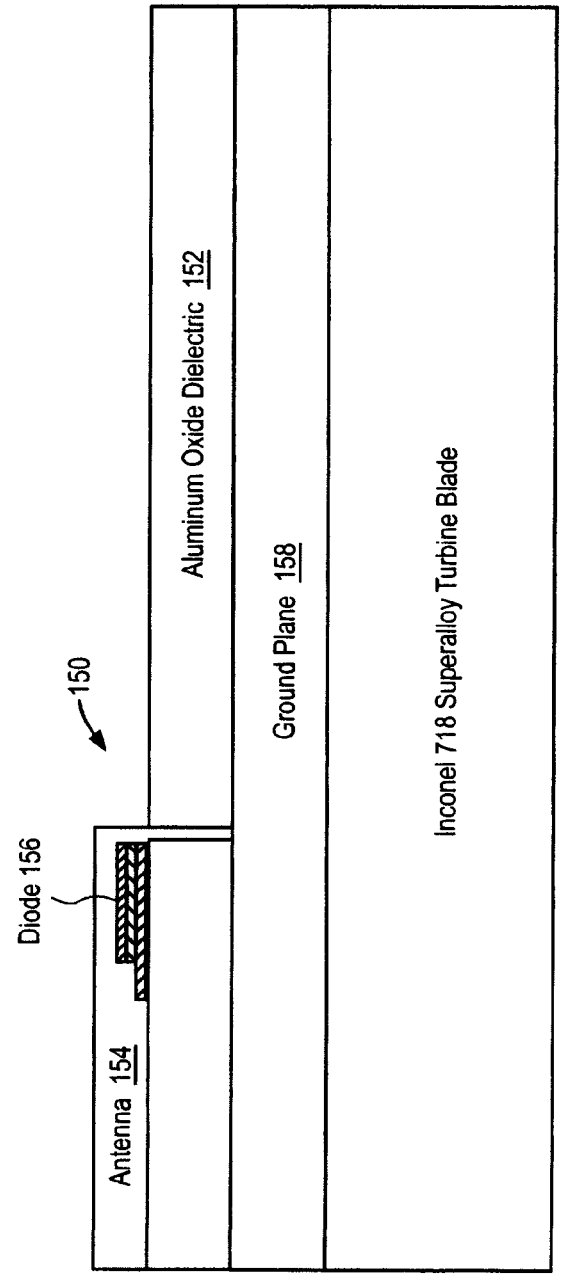

Referring to FIGS. 11A and 11B, an exemplary embodiment of a temperature sensor formed on a superalloy substrate in accordance with the principles of the present invention is described. In this embodiment, temperature sensor 150 is made using thin film techniques, and includes microplasma-sprayed alumina dielectric 152, deposited platinum lines 154 for antenna elements and interconnects, and thin film high temperature diode 156. Sensor 150 is grounded with ground plane 158, which may be a portion of turbine blade 160, via platinum lines 154. Sensor 150 is expected to have a rapid thermal response with little hysteresis between cooling and heating cycles compared to conventional thermocouples.

Figure 12A:
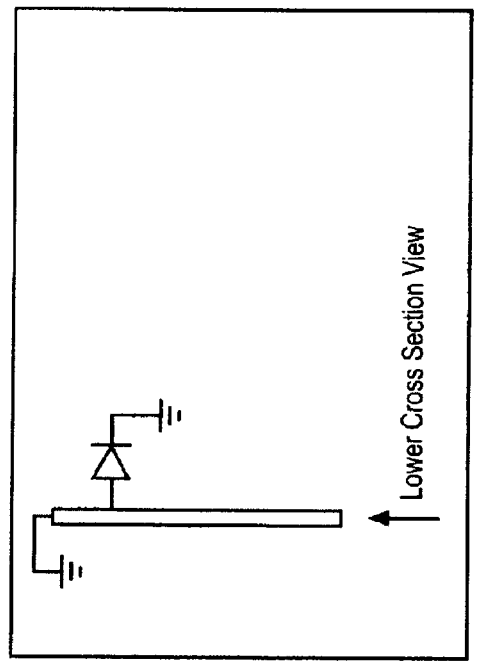
FIGS. 12A and 12B depict a plan view and a cross-sectional view, respectively, of a thin film temperature sensor in accordance with an embodiment of the invention.
Figure 12B:
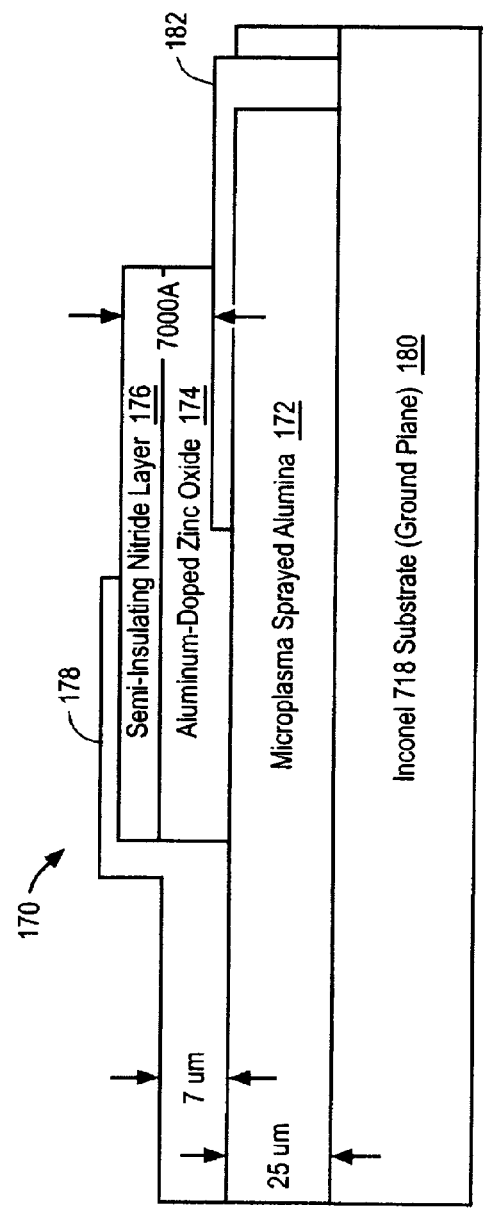

A further alternative embodiment of a thin-film temperature sensor is described with reference to FIGS. 12A and 12B. Sensor 170 comprises dielectric 172, which preferably comprises microplasma-sprayed alumina, layer 174, which comprises AZO, layer 176, which comprises semi-insulating nitride, and top layer 178, which comprises platinum. Sensor 170 is grounded to ground plate 180, which may be an Inconel 718 substrate, via ground line 182, which preferably comprises platinum. In this embodiment, the sensor is relatively thin, with dielectric 172 having a depth of approximately 25 µm, top layer having a depth of 7 µm, and the combined depth of layers 174 and 176 being approximately 5000 Å.

Figure 13:
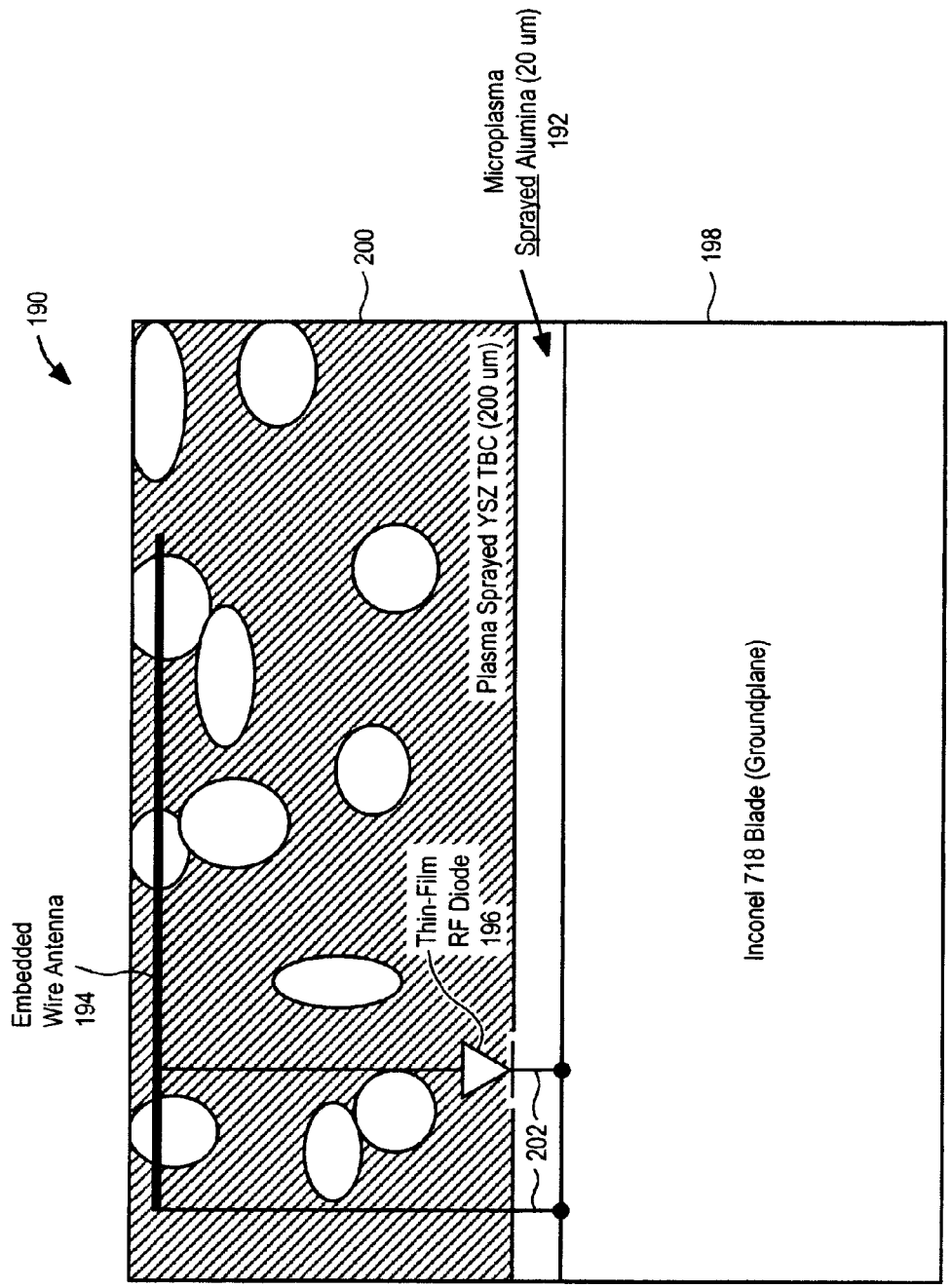
FIG. 13 depicts the structure of a thick film temperature sensor in accordance with an embodiment of the invention.

Yet another embodiment of a sensor in accordance with the present invention is a thick-film sensor, which is described in reference to FIG. 13. It will be appreciated that while such a sensor may be referred to herein as "thick," this term is relative to other disclosed embodiments. Thick film sensors preferably have a thickness of less than 0.25 mm, and are thinner than wire thermocouple sensors and other previously-known sensor devices. Thick film sensor 190 includes dielectric 192, antenna 194, and diode 196. Preferably, dielectric 192 comprises microplasma sprayed alumina having a thickness of 20 µm and is disposed between ground plane 198 and plasma sprayed YSZ TBC 200. Ground plane 198 may be an Inconel 718 turbine blade and TBC 200 may have a thickness of 200 µm. Antenna 194 is preferably embedded in TBC 200 and is grounded to ground plane 198 via ground lines 202, as is diode 196.

Figure 14:
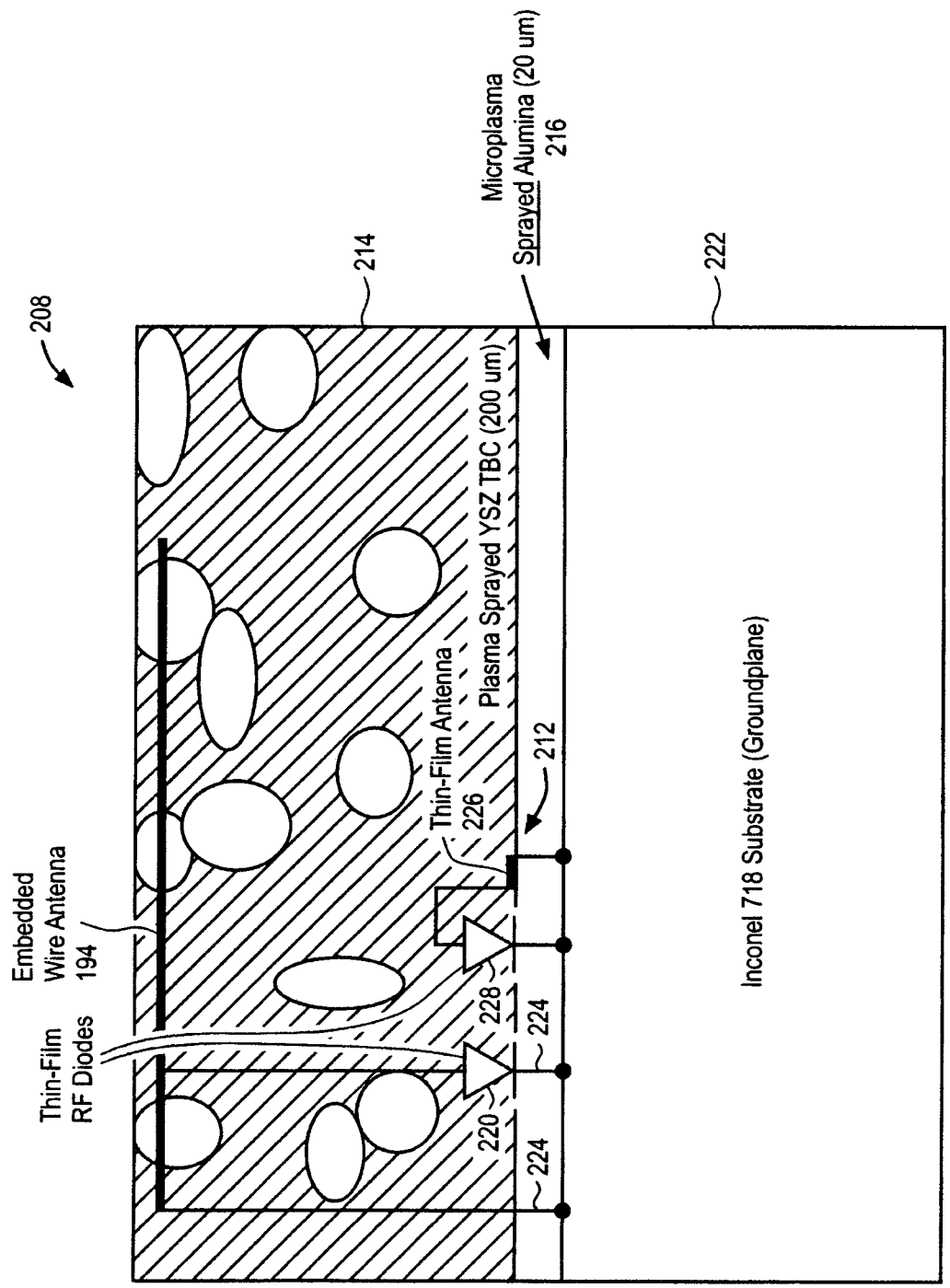
FIG. 14 depicts a side view of a heat flux sensor in accordance with an embodiment of the invention.
Figure 15:
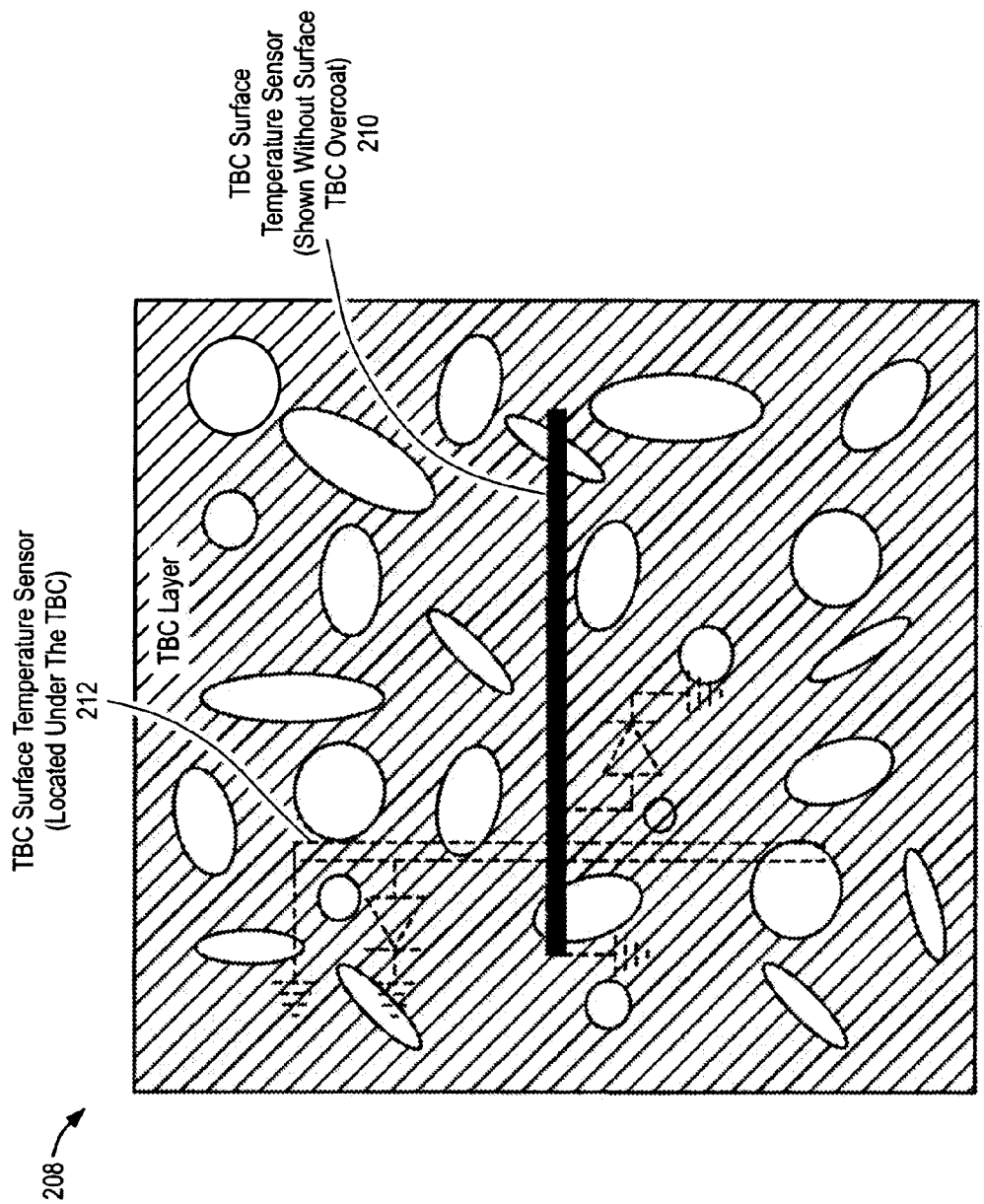
FIG. 15 depicts a top view of a heat flux sensor in accordance with an embodiment of the invention.

In still another embodiment of the invention, two temperature sensors may be used in proximity to one another to determine the heat flux between two locations, as described with respect to FIGS. 14 and 15. In the embodiment of FIG. 14, heat flux sensor 208 utilizes thick film sensor 210 with thin film sensor 212 to determine the heat flux through TBC dielectric 214. Thick film sensor 210 is constructed as described above with respect to FIG. 13 and includes dielectric 216, antenna 218, and diode 220. Preferably, dielectric 216 comprises microplasma sprayed alumina having a thickness of 20 µm and is disposed between ground plane 222 and plasma sprayed YSZ TBC 214. Ground plane 222, which may be an Inconel 718 turbine blade, and TBC dielectric 214 preferably have a known thickness. Antenna 218 preferably is embedded in TBC dielectric 214 and is grounded to ground plane 222 via ground line 224, as is diode 220. Thin film sensor 212 is similar to sensor 170 described in reference to FIG. 12, and comprises dielectric 216, antenna 226, and diode 228. Antenna 226 may be configured in any appropriate manner as described herein. Diode 228 may be configured in the same manner as diode 220 described above.

Figure 16A:
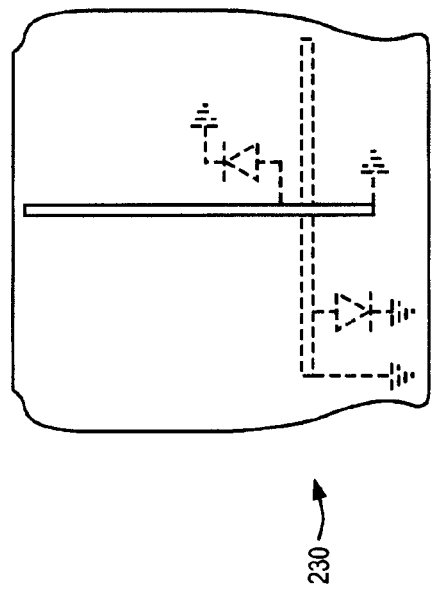
FIGS. 16A and 16B depict fabrication of a heat flux sensor in accordance with an embodiment of the invention.
Figure 16B:
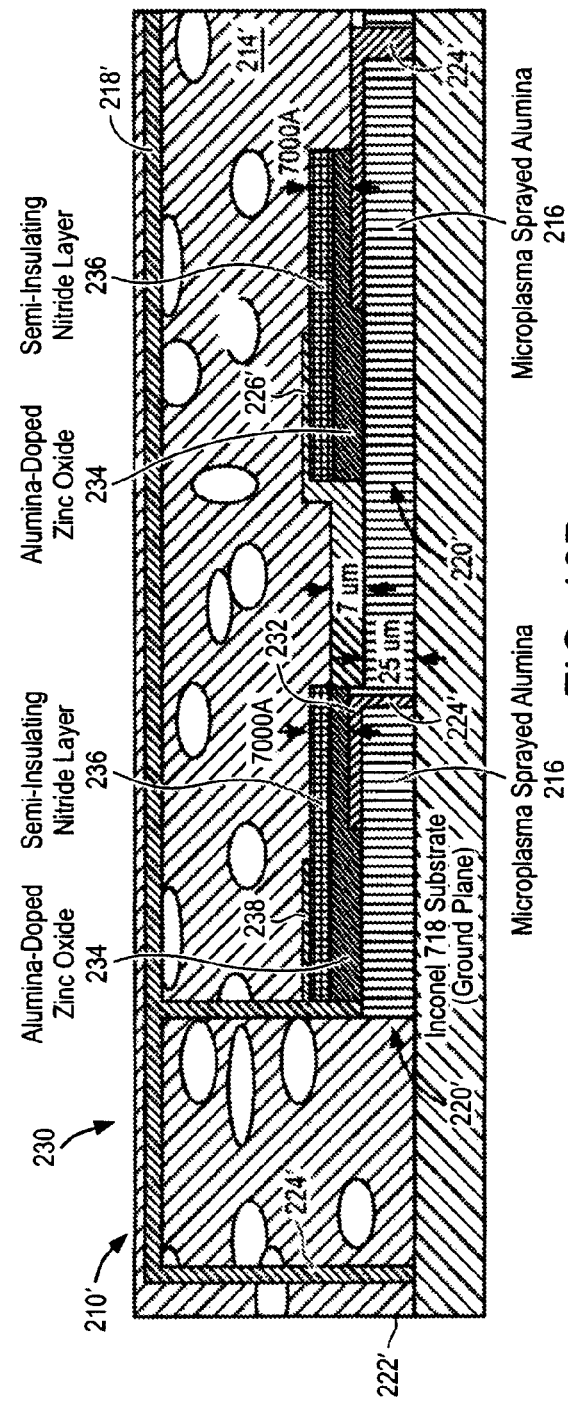

Referring now to FIGS. 16A and 16B, fabrication of a heat flux sensor in accordance with an embodiment of the invention is described. Elements in FIG. 16 having a reference number with a prime correspond to like-numbered but unprimed elements in FIGS. 14 and 15, except as noted. For example, ground plane 222' in FIG. 16B is the same as ground plane 222 in FIG. 14. Likewise, dielectric 216' in FIG. 16B is similar to dielectric 216 in FIG. 14, except that it has a thickness of 25 µm, instead of 20 µm. Diode 220' and diode 228' each comprise bottom layer 232, layer 234, layer 236, and top layer 238. Preferably, bottom layer 232 comprises ground line 224', which may comprise platinum, layer 234 comprises AZO, layer 236 comprises nitride or other insulating material, and top layer 238 comprises a platinum electrode. The combined thickness of layer 234 and layer 236 preferably is 7000 Å.

Methods of Temperature Sensor Fabrication

Embodiments of the present invention may be fabricated by known techniques, or as described herein below. The first step in a preferred fabrication sequence is to deposit a dielectric layer that electrically isolates the diode from the conductive substrate. In a preferred embodiment, the dielectric is a microplasma-sprayed alumina coating that is deposited directly onto an Inconel substrate. The thickness of the microplasma-sprayed dielectric coating preferably is approximately 20 µm and has a grain size, density and surface roughness that is compatible with the processing of metallic thin films comprising the electrodes and interconnects. The metal and semiconductor films preferably are sputter-deposited through windows created in a thick dryfilm photoresist that serves as a flexible shadow mask capable of high-resolution pattern transfer on curved surfaces. In order to minimize the RF skin effect for the components and interconnects used in the temperature sensor, conductor thickness preferably is maintained at or above 7 um. A preferred embodiment utilizes 10 µm thick platinum interconnects to address this skin effect.

The next fabrication step is the formation of the bottom electrode. In the fabrication of the electrode, relatively thick metal films by sputtering are desired. A lift-off process employing a 50 µm thick photoresist, such as DuPont dry film resist, may be used for efficient liftoff and patterning of the thin film diodes. Three complete masking and photo-lithography steps may be employed to fabricate the diode: one for the bottom electrode, one for the semiconductor and one for the top electrode.

The diode fabrication sequence may begin with the application of the dry film resist. The resist is rolled onto the desired surface and heated to 100 degrees Celsius to promote adhesion and flow of the material to conform to the surface. A photomask containing the desired artwork, specifically the first mask level-bottom electrode, is placed over the resist and exposed to UV light. The dry resist film is placed into a developer and windows are created in the resist film through which the films are deposited. The first mask level contains the connection to the ground plane through vias, thin film interconnects to the diode, and lower electrode to the diode. After stripping the first resist, a second resist film is applied and another photomask is aligned using alignment marks located on the first level to properly pattern the semiconductor film comprising the Schottky diode. After deposition and lift-off of the semiconductor film, a third mask level, corresponding to the top electrode, is patterned so as to be properly aligned to the bottom electrode and semiconductor film. Dry resist is rolled onto the surface and heated to 100 degrees Celsius to promote adhesion and a photomask containing the desired artwork, corresponding to the third mask level-top electrode, is placed over the resist and exposed to UV light. The dry film resist is placed into a developer and windows are created in the resist film through which the top electrode film is deposited. After metal deposition and lift-off, the top electrode and thus the diode structure is complete. As described above, the thin film temperature sensor of the present invention may be fabricated using a flexible, conformal shadow mask that enables sensors to be fabricated on curved blades and other non-planar surfaces and also permits the sensors to be manufactured in a production environment. Very large aspect ratios are also possible with this fabrication technique, making the formation of vias and other related structures with high aspect ratio possible.

Prior to the deposition of the microplasma-sprayed alumina dielectric layer, it is desirable to weld pins to the superalloy substrate, perpendicular to the substrate, to serve as place holders for vias to the ground plane. The resulting vias may be filled with sputtered metal so that the diode and antenna elements are eventually connected to the ground plane. Preferably, no wires are used in the fabrication of the diode that is integrated into the rest of the RF circuit used for the temperature sensor and all interconnects comprise platinum films.

The thin film lithography approach using a dry film resist is a preferred method for the deposition of the thin film wireless temperature sensors on curved turbine blades in accordance with the present invention, as described below. As in other methods described herein, it will be appreciated that the steps may be performed in a different order, omitted, or modified as desired by one of skill.

First, a superalloy substrate is cleaned by rinsing it in de-ionized water, acetone and methanol. Then a dielectric layer is applied onto the superalloy, such as by microplasma-spraying an alumina onto the surface of the superalloy. Next, a small piece of negative photoresist film is obtained and the clear polyester film is carefully removed from the concave side of the film, such as by using a razor blade or similar device. This removal exposes one side of the film. The part of the film on the concave side, from which the polyester film was removed, then is placed on the substrate so that it faces and contacts the substrate.

The substrate then is placed on a hot plate to bake the film for about two minutes. The film preferably should be rolled several times immediately after placing the substrate on the hot plate to help eliminate air pockets. After baking for two minutes, the substrate is removed from the hot plate and allowed to cool to room temperature.

Prior to exposure, the appropriate photomask is secured, e.g., using tape, onto the substrate wherein the opaque side of the mask is facing the film. Once the mask is secured, the photoresist may be exposed to ultraviolet light. Desirably, a UV light source is used and is stabilized to 250-350 Watts prior to ramping up an ultimate power of 500 Watts. When the UV light source is ready, the substrate is placed with the photoresist film under the light tunnel and exposed for the appropriate amount of time, at which point the source shutter desirably turns off automatically. After the resist-coated substrate is exposed, the mask should be carefully removed. The substrate then is placed back onto the hot plate for at least five minutes for a post-exposure bake.

To develop the exposed areas, a solution is prepared according to the following: 100 grams of de-ionized water to every 2 grams of aqueous developer solution and a similar amount of magnesium carbonate powder (MgCO3). The substrate is submerged into the developer solution and soaked until there is no scumming on the pattern being developed.

Once developed, the substrate is carefully removed from the developer solution and rinsed using de-ionized water. After the resist film is dry, it is placed back under the UV exposure beam to flood expose the film. After flood exposure, the substrate is placed back onto the hot plate for several minutes for a final bake.

The patterned substrate then is ready for thin film deposition using sputtering. After sputtering the material onto the substrate, the remaining film is removed from the substrate, such as by using a Dynastrip 7000 removal solution.

EXPERIMENTAL RESULTS

Examples of embodiments of the present invention have been constructed and tested. Representative test results will be discussed below.

EXAMPLE 1

Figure 17:
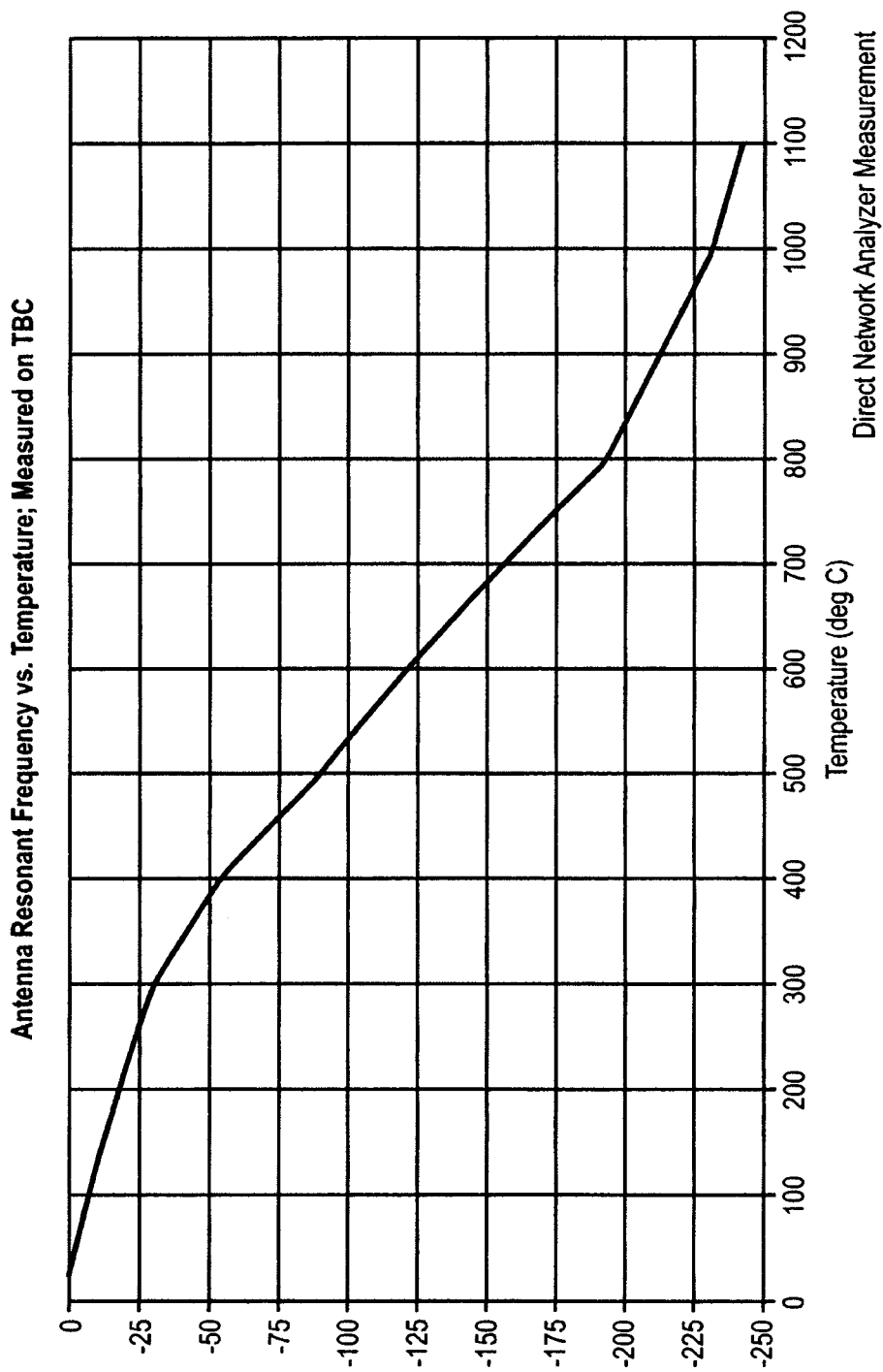
FIG. 17 is a graph showing exemplary results of the performance of a temperature sensor in accordance with an embodiment of the invention.

The frequency offset data of one embodiment of a temperature sensor constructed in accordance with the principles of the present invention has been shown to be monotonic over a desired temperature range with repeatable results over multiple measurement sets. Data demonstrating the relationship between antenna resonant frequency and temperature are shown in FIG. 17, which was acquired utilizing direct network analyzer measurements. Testing showed that data taken during transition from a high temperature to a low temperature was substantially the same as data obtained during transition from a low temperature to a high temperature. These observations indicate that there is little or no hysteresis in the temperature sensor response after repeated heating/cooling cycles. The resolution for the temperature sensor was within −187 ppm/degrees Celsius in a temperature range from 25 to 1000 degrees Celsius. By comparison, previously known devices are reported to have a resolution of −34.5 ppm/degrees Celsius in the temperature range from 10 to 80 degrees Celsius at 2.48 GHz.

EXAMPLE 2

Figure 18A:
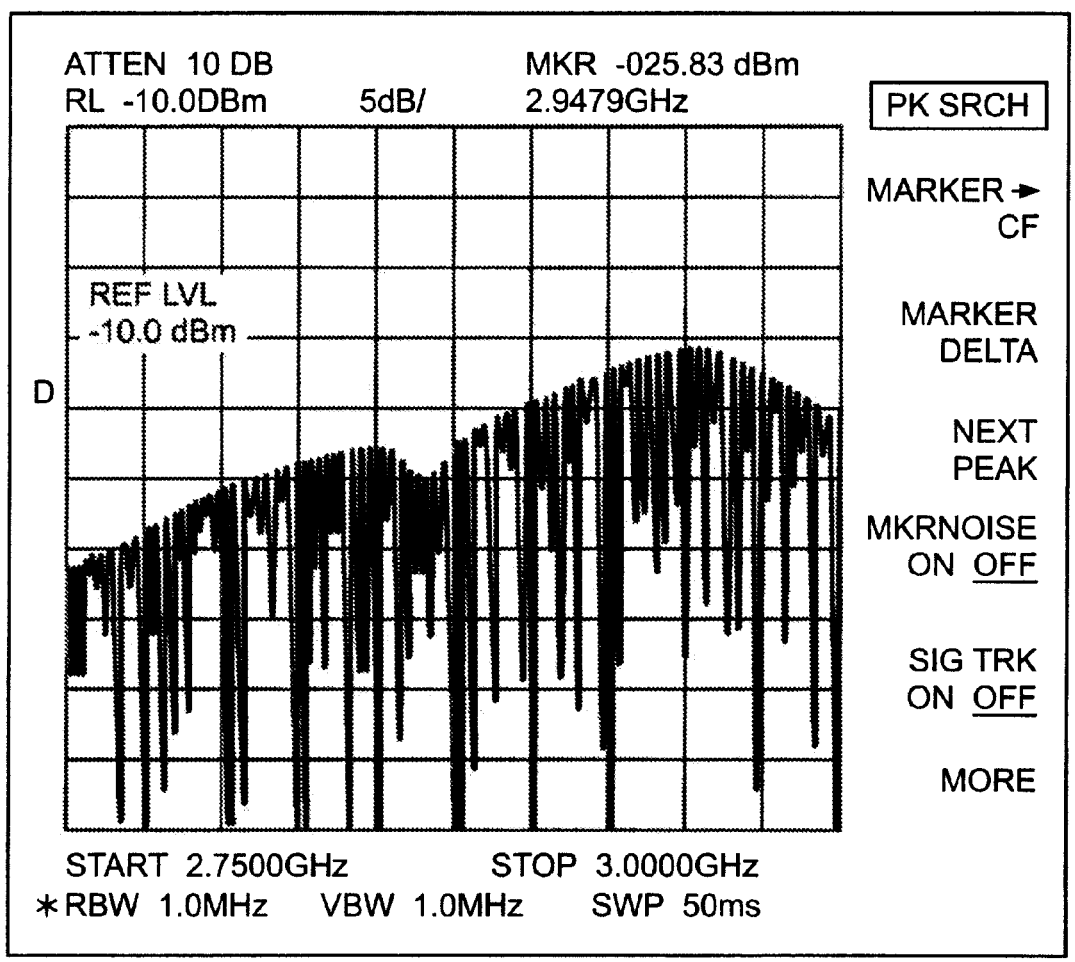

The accuracy of an embodiment of a temperature sensor constructed in accordance with the present invention was analyzed by comparing temperature determinations of the inventive sensor to the temperature of an oven. Results of these tests are presented in FIGS. 18A and 18B. As shown in the table of FIG. 18B, the testing demonstrated a strong correlation between the temperature determined with the temperature sensor and the oven temperature. These test results did not consider the oven temperature control resolution, and therefore the oven temperatures (25° C., 150° C., 200° C., 250° C.) may actually have been slightly more or less than the reported values. The temperature measurements of the temperature sensor of the present invention were conducted using a centroiding algorithm to calculate temperature from the harmonic output center frequency. For purposes of this testing, the temperature sensor included an off-the-shelf diode suitable for the limited temperature range of the tests. The results of the testing of the prototype sensor of Example 2 indicate that a production model of the temperature sensor will perform satisfactorily and provide accuracy that depends on signal processing gain and channel effects mitigation.

EXAMPLE 3

The antenna of the temperature sensor of the present invention may be considered a micro-gap derivative of a transmission line antenna due to the narrow spacing between the antenna element and the ground plane. Typically, a transmission line antenna is a conductive wire about ¼ wavelength long and placed parallel to and very close (<0.01 wavelength) to a much larger ground plane surface. One end of the ¼ wave conductor is connected to the ground plane and the other end is not connected. Close to the grounded end of the conductor, the impedance of the strip is approximately 50 ohms and purely resistive. In such embodiments, the antenna elements and associated interconnects preferably comprise platinum, rhodium, iridium, platinum:rhodium alloys, palladium or refractory materials.

Figure 19:
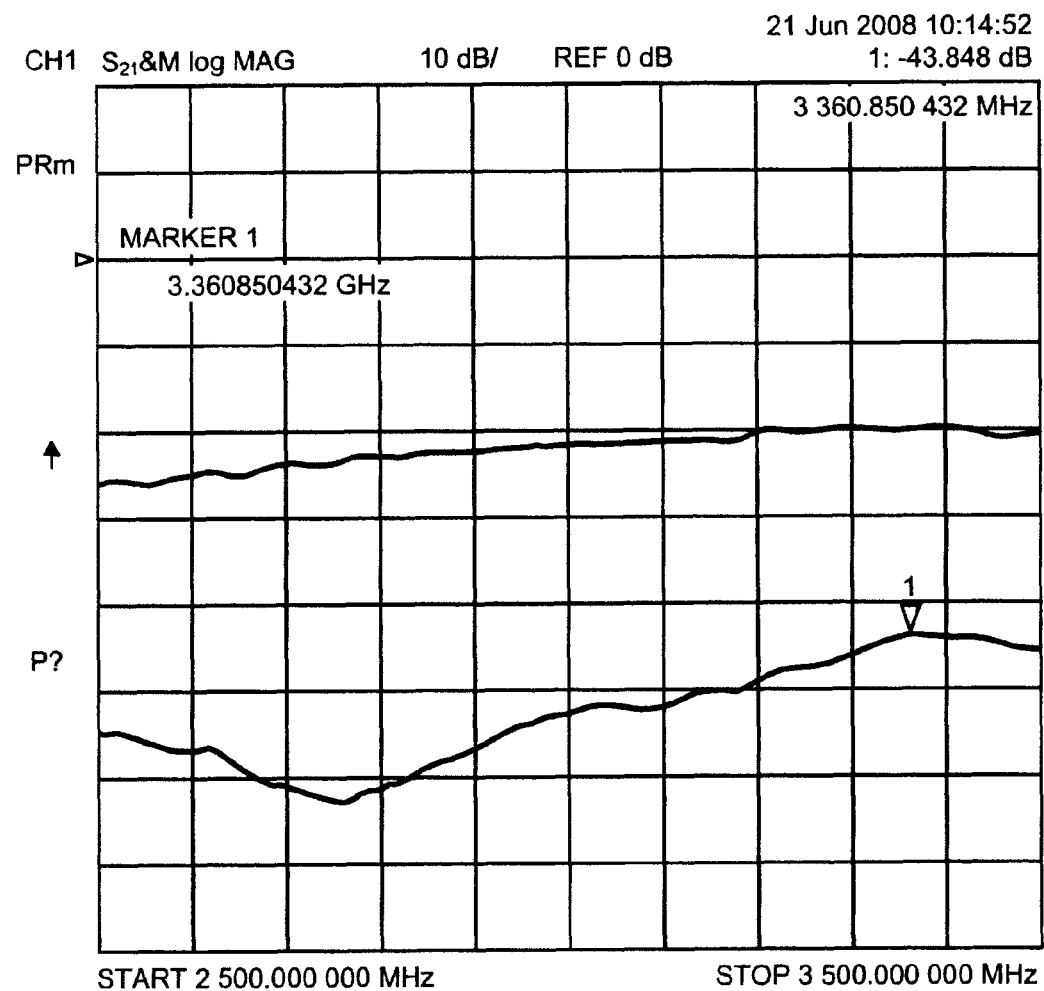
FIG. 19 is graph showing the performance of an example of an antenna in accordance with an embodiment of the invention.

An embodiment of a micro-gap antenna was constructed in accordance with the present invention. This antenna was tested and produced the results shown in FIG. 19. The performance of the antenna has been characterized over alumina, with a desired result that the gain be greater than −30 dBi. As shown in FIG. 19, the gain of the antenna was determined to be −22.1 dBi, thereby obtaining the desired result and showing that the micro-gap antenna has acceptable gain. Likewise, the measured Q value was 20, indicating an accuracy of 10 degrees in temperature measurements, which is also desirable. Accuracy of the device will be dependent on signal processing gain and channel effects mitigation.

EXAMPLE 4

An embodiment of a thermal barrier coating-based micro-gap antenna in accordance with the present invention was tested, and results of that testing are shown in the table of FIG. 20. Measured gain is listed for different testing frequencies. Additionally, a corrected gain is provided which is based on EM simulation to correct for airgap, which acts to improve efficiency of the device. These test results indicate that a TBC dielectric antenna has desired performance characteristics.

EXAMPLE 5

Figure 21A:
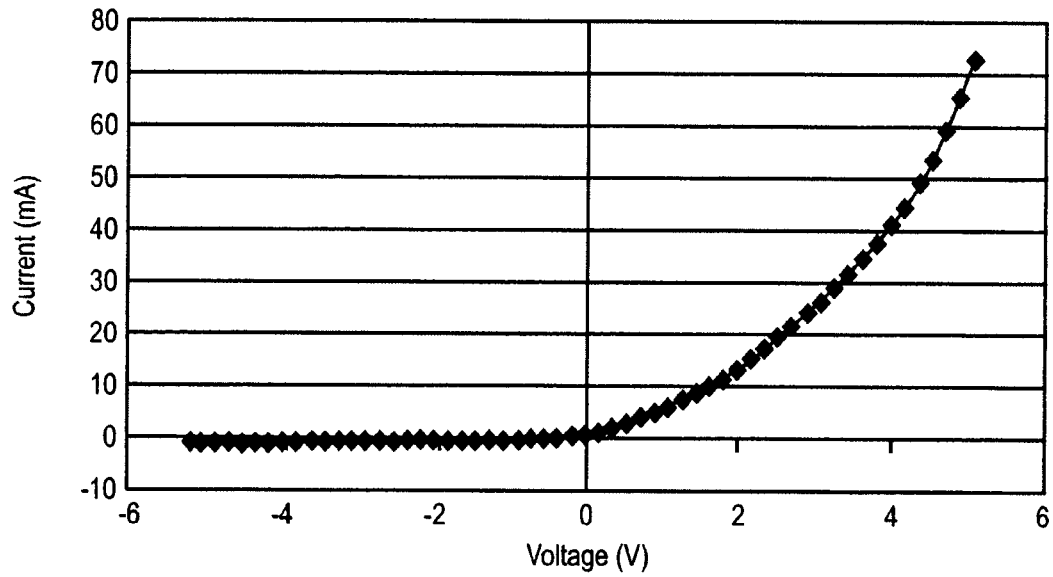
FIGS. 21A and 21B are graphs showing the relationship of current as a function of voltage of an example diode in accordance with an embodiment of the invention.
Figure 21B:
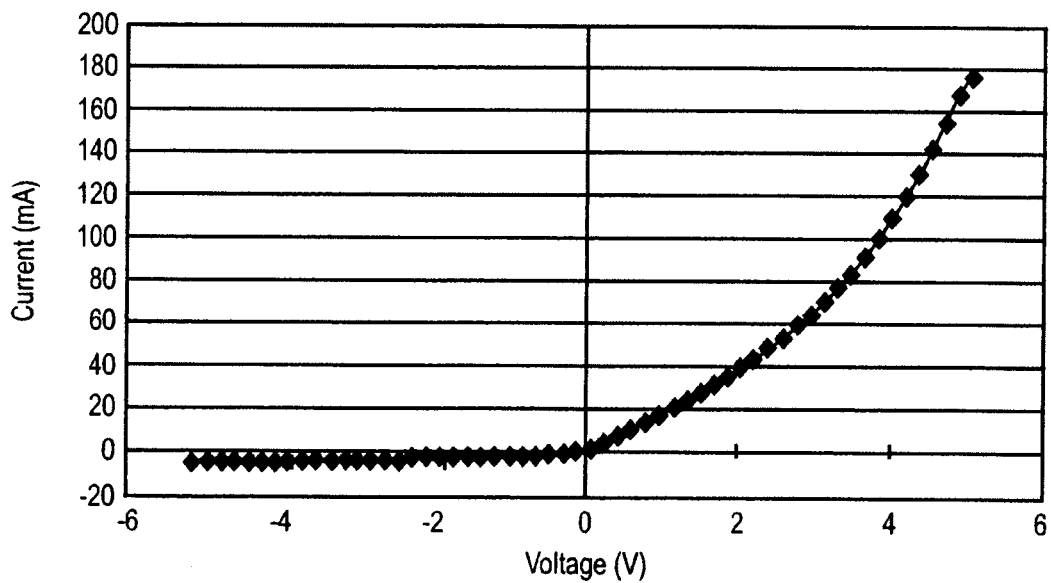

An embodiment of a diode in accordance with the present invention was tested. The relationship between voltage and current are shown in FIGS. 21A and 21B as a function of temperature. The results shown in FIG. 21A were obtained at room temperature, whereas FIG. 21B involved testing at 300 degrees Celsius. The diode tested was a thin film RF diode in which AZO was used as the high temperature oxide semiconductor. The AZO Schottky diode was annealed in nitrogen at 500 degrees Celsius and tested under DC conditions at 25 degrees Celsius and 300 degrees Celsius to examine the relationship between voltage and current. The Schottky diode was considered to have performed well under RF conditions as judged by its ability to generate desired RF harmonics. These diodes, which had a structure similar to that of the embodiment described in FIGS. 10A and 10B, demonstrated similar current-voltage relationships at room temperature as at 300 degrees Celsius.

EXAMPLE 6

Figure 22:
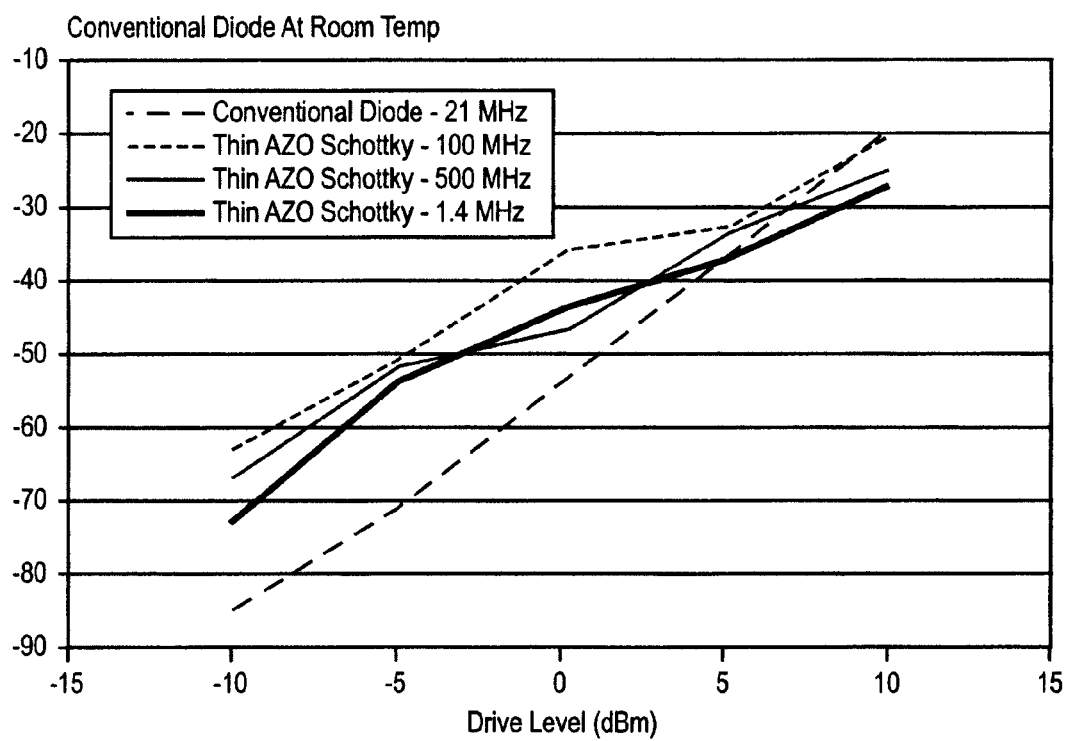
FIG. 22 is a graph showing the relationships between the second harmonic as a function of drive level of diodes accordance with embodiments of the invention.

Performance of several diodes in accordance with the present invention were evaluated and results of the testing are shown in FIG. 22. The test results correspond to the second harmonic performance at 700 degrees Celsius for several AZO thin film Schottky diodes having structures similar to the embodiment described in reference to FIGS. 10A and 10B, and for an off-the-shelf RF diode at room temperature for reference. At a drive level of −10 dB, the lines representing each of the diodes may be described as follows: the lowest line (at approximately −85) represents the conventional diode at room temperature and 21 MHz; the next highest line (at approximately −73) represents a thin AZO Schottky diode at 1.4 GHz; the next highest line (at approximately −67) represents a thin AZO Schottky diode at 500 MHz; and the highest line (at approximately −63) represents a thin AZO Schottky diode at 100 MHz. The measured diode performance was determined to be sufficient for the generation of second harmonics required for use in the wireless temperature sensor.

While preferred illustrative embodiments of the invention are described above, it will be apparent to one skilled in the art that various changes and modifications may be made therein without departing from the invention. The appended claims are intended to cover all such changes and modifications that fall within the true spirit and scope of the invention.

What is claimed:

1. A method of fabricating a temperature measurement device, the method comprising:
    depositing a dielectric material having temperature-dependent electrical properties;
    disposing an antenna at least partially within the dielectric material, the antenna having a resonant frequency that varies in response to temperature-dependent characteristics of the dielectric material, the antenna configured to receive a RF signal; and
    providing a diode in communication with the antenna and configured to produce a harmonic of the RF signal in response to receipt of the RF signal.

2. The method of claim 1, wherein depositing the dielectric material comprises depositing the dielectric material on a substrate.

3. The method of claim 2, wherein the substrate comprises a turbine blade.

4. The method of claim 2, wherein providing the diode further comprises coupling the diode to the substrate.

5. The method of claim 1, wherein the dielectric material comprises a thermal barrier coating.

6. The method of claim 1, wherein the dielectric material comprises an alumina.

7. The method of claim 6, wherein the alumina comprises a microplasma-sprayed alumina coating.

8. The method of claim 1, wherein the dielectric material comprises yttria-stabilized zirconia, aluminum oxide, hafnia, magnesia, or magnesium aluminate spinel.

9. The method of claim 1, wherein the antenna comprises platinum, palladium, rhodium, or iridium.

10. The method of claim 1, wherein the temperature measurement device has a thickness less than 0.25 mm.

11. The method of claim 1, wherein the antenna is configured to withstand temperatures greater than 250 degrees Celsius.

12. The method of claim 1, wherein the diode comprises zinc oxide, alumina doped zinc oxide, indium doped zinc oxide, tin oxide, or indium oxide.

13. The method of claim 1, wherein the diode comprises a Schottky diode.

14. The method of claim 1, wherein the diode comprises a nitrided layer and a non-nitrided layer.

15. The method of claim 1, wherein providing the diode comprises depositing the diode on the dielectric material.

16. The method of claim 1, wherein the temperature measurement device is configured to be fabricated on a non-planar surface.

17. The method of claim 1, wherein providing the diode comprises stacking an electrode, a first layer, and a second layer.

18. The method of claim 17, wherein the electrode comprises platinum or palladium.

19. The method of claim 17, wherein the first layer comprises a semiconductor layer comprising zinc oxide, alumina doped zinc oxide (AZO), indium doped zinc oxide (IZO), tin oxide, or indium oxide and the second layer comprises nitride.

20. The method of claim 17, wherein providing the diode further comprises stacking a third layer comprising a Schottky metal.

* * * * *